(12) United States Patent
Katsumata et al.

(10) Patent No.: US 11,190,703 B2
(45) Date of Patent: Nov. 30, 2021

(54) IMAGE-CAPTURING APPARATUS, PROGRAM, AND ELECTRONIC DEVICE THAT CONTROLS IMAGE SENSOR BASED ON MOVING VELOCITY

(71) Applicant: NIKON CORPORATION, Tokyo (JP)

(72) Inventors: Yuki Katsumata, Kawasaki (JP); Naoki Sekiguchi, Yashio (JP)

(73) Assignee: NIKON CORPORATION, Tokyo (JP)

( * ) Notice: Subject to any disclaimer, the term of this patent is extended or adjusted under 35 U.S.C. 154(b) by 9 days.

(21) Appl. No.: 16/332,427

(22) PCT Filed: Sep. 29, 2017

(86) PCT No.: PCT/JP2017/035653
§ 371 (c)(1),
(2) Date: Oct. 18, 2019

(87) PCT Pub. No.: WO2018/062537
PCT Pub. Date: Apr. 5, 2018

(65) Prior Publication Data
US 2020/0059588 A1    Feb. 20, 2020

(30) Foreign Application Priority Data
Sep. 30, 2016   (JP) .............................. JP2016-194630

(51) Int. Cl.
*H04N 5/238* (2006.01)
*H04N 5/235* (2006.01)
*H04N 5/232* (2006.01)

(52) U.S. Cl.
CPC ....... *H04N 5/2353* (2013.01); *H04N 5/23218* (2018.08)

(58) Field of Classification Search
CPC .......................... H04N 5/2353; H04N 5/23218
(Continued)

(56) References Cited

U.S. PATENT DOCUMENTS 7,623,159 B2 * 11/2009 Wada .................... G03B 17/00
                                                              348/205
7,952,612 B2 *  5/2011 Kakkori ............. H04N 5/23248
                                                              348/208.6
(Continued)

FOREIGN PATENT DOCUMENTS

JP       2008-079222 A       4/2008
JP       2008-174078 A       7/2008
(Continued)

OTHER PUBLICATIONS

Dec. 12, 2017 International Search Report issued in International Patent Application No. PCT/JP2017/035653.
(Continued)

*Primary Examiner* — Usman A Khan
(74) *Attorney, Agent, or Firm* — Oliff PLC

(57) ABSTRACT

An image-capturing apparatus for generating a moving image includes an image sensor that receives light from a subject and outputs moving image data, an acquisition unit that acquires velocity information, and a control unit that controls an exposure time of the image sensor. The control unit controls the image sensor to receive the light from the subject for a first exposure time and changing the first exposure time to a second exposure time for accumulating electric charges, the second exposure time being longer than the first exposure time, based on the velocity information of the image-capturing apparatus.

7 Claims, 17 Drawing Sheets

(58) Field of Classification Search
USPC .......................................................... 348/364
See application file for complete search history.

(56) References Cited

U.S. PATENT DOCUMENTS

2005/0248660 A1* 11/2005 Stavely .............. H04N 5/23258
348/208.16
2012/0038796 A1* 2/2012 Posa .................. H04N 5/23296
348/240.2

FOREIGN PATENT DOCUMENTS

| JP | 2009-017474 A | 1/2009 |
| JP | 2012-205163 A | 10/2012 |
| WO | 2015/098156 A1 | 7/2015 |

OTHER PUBLICATIONS

Sep. 23, 2020 Office Action issued in Chinese Patent Application No. 201780073728.9.
Oct. 19, 2021 Office Action issued in Japanese Patent Application No. 2018-542966.

\* cited by examiner

US 11,190,703 B2

IMAGE-CAPTURING APPARATUS, PROGRAM, AND ELECTRONIC DEVICE THAT CONTROLS IMAGE SENSOR BASED ON MOVING VELOCITY

TECHNICAL FIELD

The present invention relates to an image-capturing apparatus and a program.

BACKGROUND ART

An image-capturing apparatus attached to a moving person or object to capture a moving image is known (see PTL1). Although the image-capturing apparatus may move during image-capturing, photographing conditions for photographing during movement has been not taken into consideration.

CITATION LIST

Patent Literature

PTL1: Japanese Laid-Open Patent Publication No. 2012-205163

SUMMARY OF INVENTION (1) An image-capturing apparatus according to the 1st aspect of the present invention for generating a moving image comprises: an image sensor that receives light from a subject and outputs moving image data; an acquisition unit that acquires velocity information; and a control unit that controls an exposure time of the image sensor, wherein the control unit controls the image sensor to receive the light from the subject for a first exposure time and changing the first exposure time to a second exposure time for accumulating electric charges, the second exposure time being longer than the first exposure time, based on the velocity information of the image-capturing apparatus.

(2) An image-capturing apparatus according to the 2nd aspect of the present invention for generating a moving image, comprises: an image sensor that receives light from a subject and outputs moving image data; an acquisition unit that acquires velocity information on the image-capturing apparatus; and a control unit that controls a region to be processed for a moving image from the moving image data, based on the velocity information acquired by the acquisition unit.

(3) A program according to the 3rd aspect of the present invention, executed by an image-capturing apparatus that generates a moving image based on an output from an image sensor that captures images of a subject, causes a computer to execute: a first step of acquiring velocity information; a second step of controlling the image sensor to receive the light from the subject for a first exposure time and accumulate by changing the first exposure time to a second exposure time, the second exposure time being longer than the first exposure time, based on the velocity information of the image-capturing apparatus acquired in the first step.

(4) A program according to the 4th aspect of the present invention, executed by an image-capturing apparatus that generates a moving image based on an output from an image sensor that captures images of a subject, causes a computer to execute: an image sensor that outputs moving image data; a first step of acquiring velocity information on the image-capturing apparatus; and a second step of controlling a region to be processed for a moving image from the moving image data, based on the velocity information acquired by the first step.

(5) An electronic device according to the 5th aspect of the present invention that generates moving image data, comprises an image sensor that receives light from a subject and outputs moving image data; an acquisition unit that acquires information on movement of the image sensor; and a control unit that controls the exposure time of the image sensor, based on the information on the movement acquired by the acquisition unit.

DESCRIPTION OF EMBODIMENTS

First Embodiment

Figure 1:
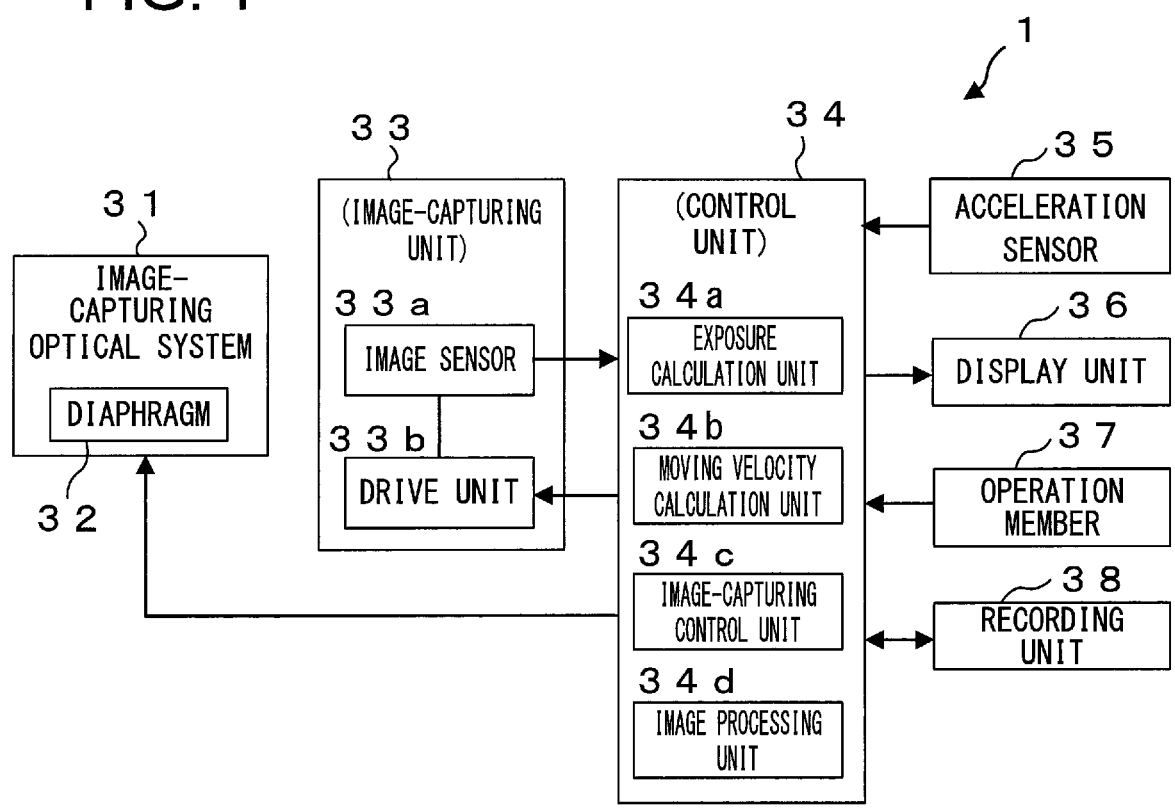
FIG. 1 is a block diagram showing a configuration of a camera according to a first embodiment.

A first embodiment of an image-capturing apparatus will be described with reference to FIGS. 1 to 6. FIG. 1 is a block diagram showing a configuration of a digital camera as an example of the image-capturing apparatus according to the present embodiment. The camera 1 according to the present embodiment is a camera that is attached to a moving person or object to generate moving images and still images by capturing images of subjects, such as a camera called an action camera, an action cam, a wearable camera, or the like. Further, the camera is not limited to a so-called action camera and the like, but may be a digital camera, a portable phone having a camera function, and the like. The camera 1 includes an image-capturing optical system 31, an image-capturing unit 33, a control unit 34, an acceleration sensor 35, a display unit 36, an operation member 37, and a recording unit 38.

The image-capturing optical system 31 guides a light flux from a subject field to the image-capturing unit 33. The image-capturing optical system 31 is provided with a diaphragm 32 in addition to lenses (not shown). The image-capturing unit 33 includes an image sensor 33a and a drive unit 33b, and photoelectrically converts a subject image formed by the image-capturing optical system 31 to generate an electric charge. The drive unit 33b generates a drive signal required for causing the image sensor 33a to perform exposure control, that is, electric charge accumulation control. Image-capturing instructions such as exposure time (accumulation time) to the image-capturing unit 33 are transmitted from the control unit 34 to the drive unit 33b.

The control unit 34 includes a CPU, for example, and controls overall operation of the camera 1. For example, the control unit 34 performs a predetermined exposure calculation based on a photoelectric conversion signal acquired by the image-capturing unit 33 to determine exposure conditions such as the electric charge accumulation time (exposure time) of the image sensor 33a, an ISO sensitivity, an aperture value of the diaphragm 32 required for a proper exposure and instruct them to the drive unit 33b and the diaphragm 32.

The control unit 34 includes an exposure calculation unit 34a, a moving velocity calculation unit 34b, an image-capturing control unit 34c, and an image processing unit 34d. The units are implemented in software by the control unit 34 executing program stored in a nonvolatile memory (not shown); however, the units may include an ASIC and the like.

The exposure calculation unit 34a detects brightness of the subject based on the image signal from the image sensor 33a to determine the exposure time, the ISO sensitivity, and the aperture value required for a proper exposure.

The moving velocity calculation unit 34b calculates a moving velocity of the camera 1 based on information on an acceleration of the camera 1. Further, the moving velocity calculation unit 34b may calculate the moving velocity of the camera 1 based on a signal from a global positioning system (GPS).

As described later, the image-capturing control unit 34c changes the exposure time (accumulation time) determined by the exposure calculation unit 34a based on the moving velocity of the camera 1 calculated by the moving velocity calculation unit 34b.

The image processing unit 34d performs image processing on the image data acquired by the image-capturing unit 33. The image processing includes, for example, color interpolation processing, pixel defect correction processing, edge enhancement processing, noise reduction processing, white balance adjustment processing, gamma correction processing, display brightness adjustment processing, saturation adjustment processing, and the like. Further, the image processing unit 34d generates an image to be displayed by the display unit 36.

The acceleration sensor 35 detects the acceleration of the camera 1 and outputs the detected result to the moving velocity calculation unit 34b of the control unit 34. The moving velocity calculation unit 34b then calculates the moving velocity of the camera 1 based on the acceleration detected by the acceleration sensor 35.

The display unit 36 reproduces and displays images generated by the image processing unit 34d, images subjected to image processing, images read by the recording unit 38, and the like. The display unit 36 also displays an operation menu screen, a setting screen for setting image-capturing conditions, and the like.

The operation member 37 includes various operation members such as a release button and a menu button. The operation member 37 sends operation signals corresponding to operations to the control unit 34. The operation member 37 also includes a touch operation member provided on a display surface of the display unit 36.

In accordance with the instruction from the control unit 34, the recording unit 38 records image data and the like in a recording medium including a memory card (not shown) and the like. Further, the recording unit 38 reads the image data recorded in the recording medium in accordance with the instruction from the control unit 34.

Figure 2:
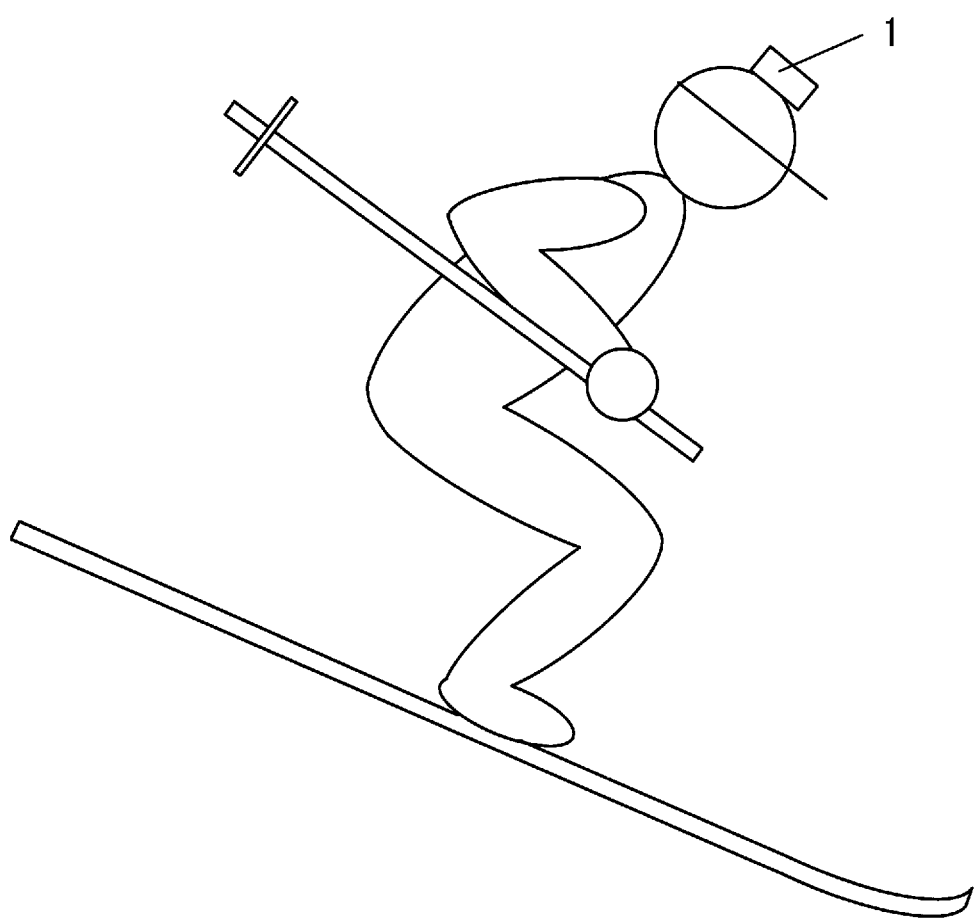
FIG. 2 is a view schematically showing a camera attached to the head of a skier who skis down a slope.

The camera 1 configured as described above can capture images of subjects to generate still images and moving images and record image data obtained by image-capturing on the recording medium. Additionally, the camera 1 is suitably attached to a moving person or object to capture images and generates moving images, as shown in FIG. 2. FIG. 2 is a view schematically showing a camera attached to the head of a skier (athlete) who skis down a slope, as an example of a moving person. In the example shown in FIG. 2, the camera 1 is attached to the head of the skier; however, the camera 1 may be attached to the chest or arm of the skier or may be attached to a ski plate.

Figure 3:
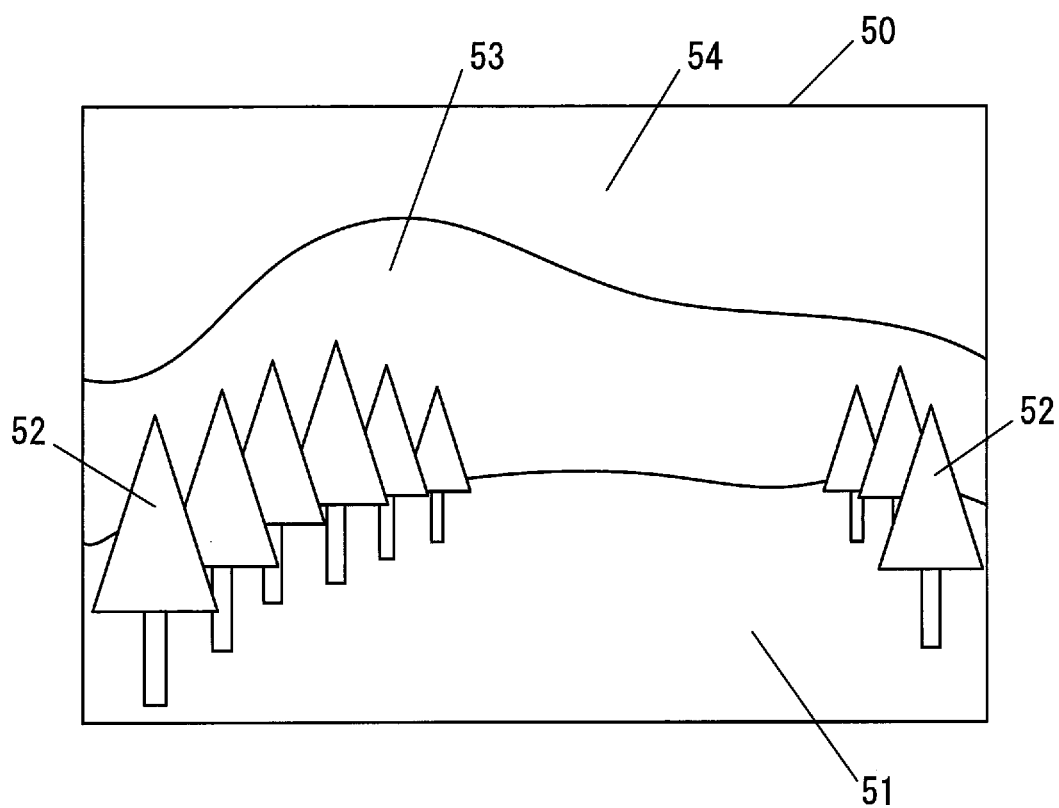
FIG. 3 is an example of an image in a frame of a moving image captured by a camera attached to the head of the skier shown in FIG. 2, showing a state of the slope.

FIG. 3 is an example of an image in a frame of a moving image captured and generated by the camera 1 attached to the head of the skier shown in FIG. 2, showing a state of the slope. This image 50 includes a plurality of trees 52 located on both sides of a slope 51 covered with snow. The image 50 also includes a mountain 53 behind the slope 51, and a sky 54 above the mountain 53.

Generally, with this type of camera, photographing is performed with the photographing optical system 31 having a short focal length, that is, a wide angle of view. Additionally, photographing is often performed with a relatively short exposure time. When the camera 1 moves during image-capturing, the wide angle of view and the short exposure time may result in a reduced image blur of surrounding scenery, so that a viewer can feel less smoothness of a moving image during reproduction.

As a result, when the photographed and generated moving image is reproduced, a viewer feels a sense of speed less than that actually experienced by the skier during photographing. For example, in a case where the camera 1 moves with a person as shown in FIG. 2, for example, a moving surrounding scene such as the trees 52 in FIG. 3 is recorded in a moving image obtained by image-capturing with the camera 1. However, a viewer may feel less smoothness during reproduction, which may result in a less sense of speed.

Thus, the camera 1 according to the present embodiment controls the exposure time based on velocity information on the camera 1. Here, the velocity information is information on the moving velocity of the camera 1, for example. The image-capturing condition is changed so as to extend the exposure time when the moving velocity of the camera 1 exceeds a certain level, so that image blur occurs appropriately in the image obtained by image-capturing in each image-capturing frame. Specifically, the control unit 34 changes the image-capturing condition so that the exposure time is extended as the moving velocity of the camera 1 increases, as described below.

The moving velocity calculation unit 34b of the control unit 34 calculates the moving velocity V of the camera 1 based on the acceleration of the camera 1 detected by the acceleration sensor 35. If the moving velocity V of the camera 1 calculated by the moving velocity calculation unit 34b is less than a first predetermined value V1, the image-capturing control unit 34c does not change the exposure time determined by the exposure calculation unit 34a. On the other hand, if the moving velocity V of the camera 1 calculated by the moving velocity calculation unit 34b is equal to or more than the first predetermined value V1, the image-capturing control unit 34c changes the exposure time to be longer than the exposure time determined by the exposure calculation unit 34a.

More specifically, if the moving velocity V of the camera 1 is equal to or more than the first predetermined value V1 and is less than a second predetermined value V2, the image-capturing control unit 34c extends the accumulation time determined by the exposure calculation unit 34a, by multiplying it by a factor a (which is a value larger than 1). Further, if the moving velocity V of the camera 1 is equal to or more than the second predetermined value V2, the image-capturing control unit 34c further extends the accumulation time determined by the exposure calculation unit 34a, by multiplying it by a factor b (b>a), for example. Note that a and b may be fixed values or may be variable values that change based on other exposure conditions such as ISO sensitivity, aperture value, frame rate, and the like. Furthermore, a and b may be integers or decimal fractions. Moreover, the process is not limited to extension by multiplying the exposure time by the factor a or b, but may also be extension of the exposure time by c seconds.

Note that the extension of the exposure time in two stages in accordance with the moving velocity V of the camera 1 is merely one example, and the extension may be performed in one step or in three or more steps. Further, instead of extending the exposure time in stages in accordance with the moving velocity V as described above, the exposure time may be continuously extended in accordance with the moving velocity V of the camera 1. Specifically, the exposure time may be extended as the moving velocity of the camera 1 increases. For example, in an initial setting, the exposure time may be set to an exposure time A that is between one quarter and one half of a time determined by a frame rate, and then the exposure time may be extended from the exposure time A as the moving velocity of the camera 1 increases.

When the exposure time is extended in accordance with the moving velocity of the camera 1, the exposure calculation unit 34a reduces the ISO sensitivity so that a proper exposure is achieved with the exposure time changed by the image-capturing control unit 34c to prevent over-exposure. Note that, instead of or in addition to reducing the ISO sensitivity, the exposure calculation unit 34a may increase an aperture F value.

Figure 4:
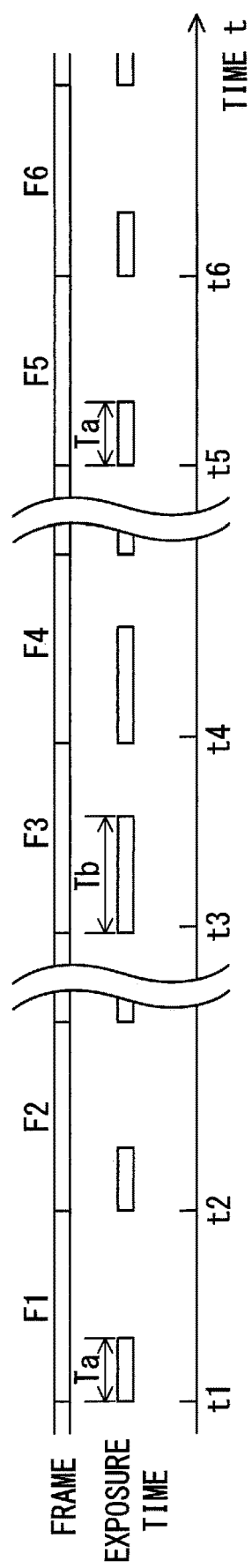
FIG. 4 is a diagram showing a relationship between frames photographed as a moving image at a constant frame rate and exposure times.

FIG. 4 is a diagram showing a relationship between frames photographed as a moving image at a constant frame rate and exposure times. In FIG. 4, the horizontal axis represents time t.

Time points t1 to t6 are exposure start times in frames F1 to F6, respectively. It is assumed that, at time points t1 to t2, the moving velocity V of the camera 1 is less than the first predetermined value V1. In this case, the image-capturing control unit 34c does not change the exposure time Ta determined by the exposure calculation unit 34a in each of the frames F1, F2 in which exposure starts at the time points t1, t2.

If the moving velocity V of the camera 1 changes to be equal to or more than the first predetermined value V1 between time points t2 and t3, the image-capturing control unit 34c changes the exposure time in the frame F3, in which exposure starts at the time point t3, to be an exposure time Tb that is longer than the exposure time Ta determined by the exposure calculation unit 34a. Note that, as described above, if the moving velocity V of the camera 1 is equal to or more than the first predetermined value V1 and is less than the second predetermined value V2, the image-capturing control unit 34c changes the exposure time Ta determined by the exposure calculation unit 34a by multiplying it by the factor a. Furthermore, as described above, if the moving velocity V of the camera 1 is equal to or more than the second predetermined value V2, the image-capturing control unit 34c changes the exposure time Ta determined by the exposure calculation unit 34a by multiplying it by the factor b.

If the moving velocity V of the camera 1 is equal to or more than the first predetermined value V1 between time points t3 and t4, the image-capturing control unit 34c remains the exposure time Tb in a frame F4. That is, if the moving velocity V of the camera 1 changes to be equal to or more than the first predetermined value V1 and is less than the second predetermined value V2 between time points t3 and t4, the exposure time in the frame 4 is set to the exposure time Ta multiplied by the factor a. Moreover, if the moving velocity V of the camera 1 changes to be equal to or more than the second predetermined value V2 between time points t3 and t4, the exposure time in the frame 4 is set to the exposure time Ta multiplied by the factor b.

Thereafter, for example, if the moving velocity V of the camera 1 again changes to be less than the first predetermined value V1 between time points t4 and t5, the image-capturing control unit 34c returns the exposure time in the frame F5, in which exposure starts at the time point t5, to be the exposure time Ta determined by the exposure calculation unit 34a.

If the moving velocity V of the camera 1 remains less than the first predetermined value V1 between time points t5 and t6, the image-capturing control unit 34c remains the exposure time Ta in a frame F6.

In this way, the exposure time becomes longer as the moving velocity V of the camera 1 increases. Accordingly, an appropriate image blur is added to the moving image. This can allow the moving image to be smoothly reproduced and prevent a reduction in a sense of speed, thereby giving a viewer viewing the moving image a realistic sense of presence.

Note that the exposure time cannot be set to be longer than a time determined by a set frame rate. The exposure time thus has an upper limit value depending on the set frame rate. Therefore, in the camera 1 according to the present embodiment, a preset frame rate is reduced if the exposure time calculated based on the moving velocity V of the camera 1 exceeds the above-described upper limit value. Specifically, the control unit 34 reduces the preset frame rate as described below. Here, the above-described "upper limit value" may be a time (for example, 1/30 of a second) determined by the frame rate or may be shorter than the time determined by the frame rate. Here, a time shorter than the time determined by the frame rate is, for example, 4/5 of the time determined by the frame rate. However, 4/5 is merely one example and the time may be preset by the camera 1 or may be set by a user.

In the camera 1 according to the present embodiment, the frame rate is preset to a predetermined value by a setting operation of the user before the start of image-capturing, or the like. In the following description, the frame rate preset in this way is referred to as a first frame rate.

The image-capturing control unit 34c calculates the exposure time based on the moving velocity V of the camera 1 as described above and compares the calculated exposure time with the upper limit value of the exposure time at the first frame rate. If the image-capturing control unit 34c determines that the calculated exposure time exceeds the upper limit value of the exposure time at the first frame rate, the image-capturing control unit 34c changes the frame rate to be a second frame rate that is lower than the first frame rate.

Note that the second frame rate may be any frame rate that can sufficiently provide the exposure time calculated by the image-capturing control unit 34c and a time required for reading electric charges from the image sensor 33a and the like. Therefore, the second frame rate may be associated with the first frame rate in advance or may be calculated based on the calculated exposure time and the time required for reading electric charges from the image sensor 33a and the like. Furthermore, for example, the second frame rate may be one half or one third of the first frame rate.

If the image-capturing control unit 34c determines that the calculated exposure time does not exceed the upper limit value of the exposure time at the first frame rate, the image-capturing control unit 34c sets the frame rate to the first frame rate.

Figure 5:
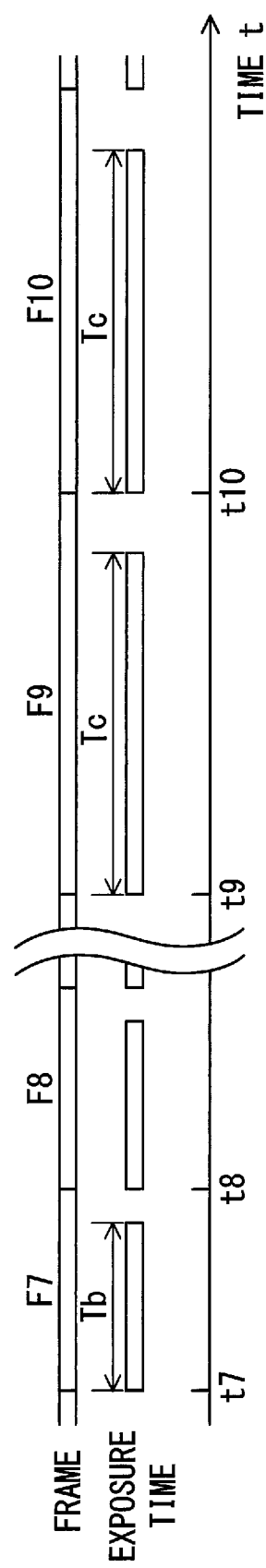
FIG. 5 is a diagram showing a relationship between frames and exposure times.

FIG. 5 is a diagram showing a relationship between frames and exposure times. In each of the frames F7, F8 in which exposure starts at time points t7, t8, respectively, exposure is performed with the exposure time Tb (Tb>Ta) calculated based on the moving velocity of the camera 1 that is equal to or more than the first predetermined value V1. Here, the exposure time Tb in the frames F7, F8 is equal to or less than the upper limit value of the exposure time at the first frame rate, and the frame rate in the frames F7, F8 remains the first frame rate.

It is assumed that the moving velocity V of the camera 1 further increases between time points t8 and t9 to be equal to or more than the second predetermined value V2, for example. In this case, the image-capturing control unit 34c calculates an exposure time Tc based on the moving velocity V of the camera 1 that is equal to or more than the second predetermined value V2 and compares the exposure time Tc with the upper limit value of the exposure time at the first frame rate. If the calculated exposure time Tc exceeds the above upper limit value, the image-capturing control unit 34c changes the frame rate in the frame F9 to be a second frame rate that is smaller than the first frame rate, and sets the exposure time of the frame F9 to the exposure time Tc.

Between time points t9 and t10, if the moving velocity V of the camera 1 remains the moving velocity between the time points t8 and t9, the image-capturing control unit 34c remains the frame rate of the frame F10 at the second frame rate and the exposure time of the frame F10 at Tc.

Although not shown in the figure, at a time point after the time point t10, if the moving velocity V of the camera 1 is reduced and the exposure time calculated based on the moving velocity V is equal to or less than the upper limit value of the exposure time at the first frame rate, the image-capturing control unit 34c returns the frame rate to the first frame rate and performs exposure control for the calculated exposure time.

Figure 6:
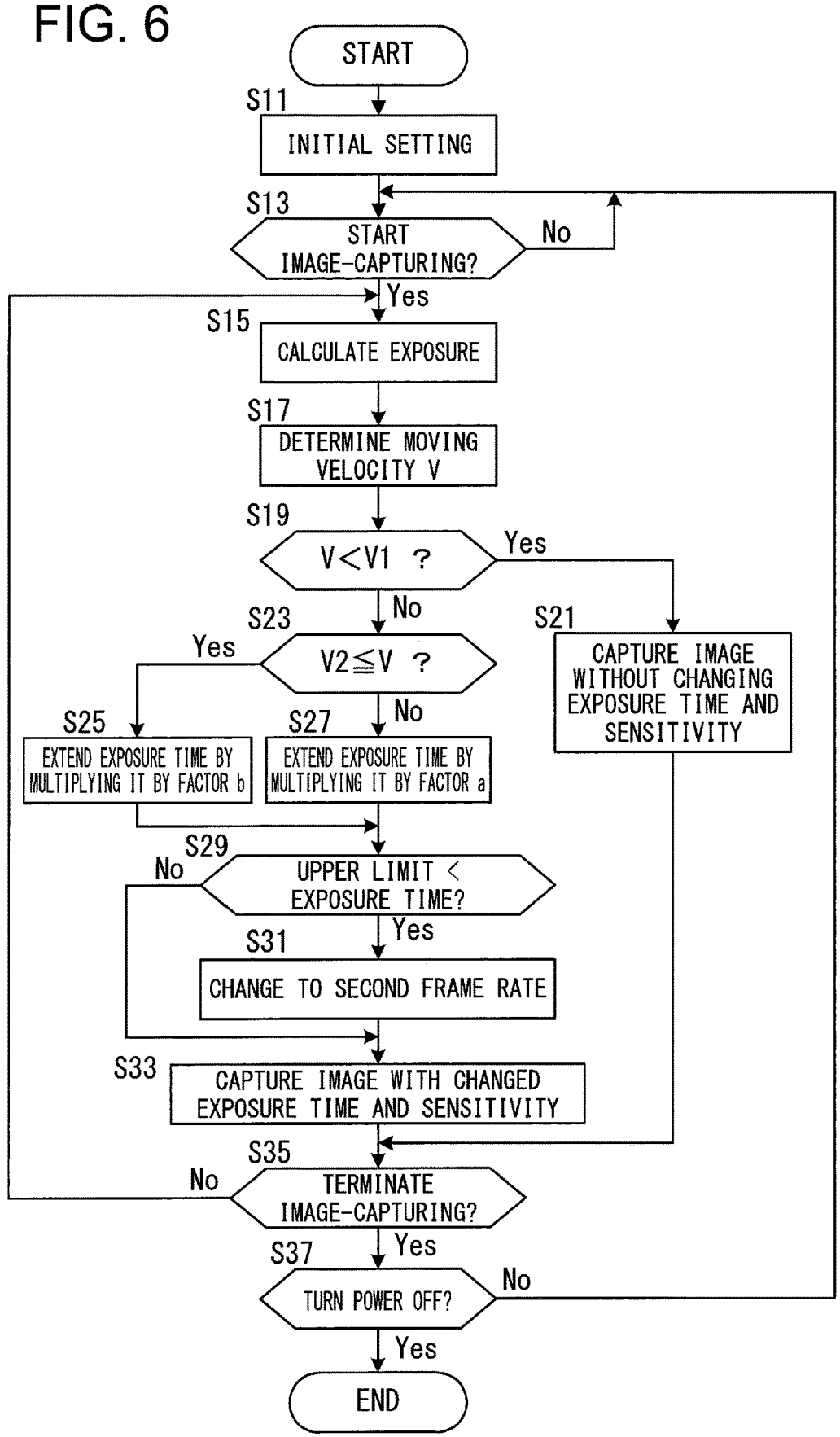
FIG. 6 is a flowchart showing a process relating to image-capturing by the camera according to the first embodiment.

FIG. 6 is a flowchart showing a process relating to image-capturing by the camera 1 according to the first embodiment. The process of the flowchart shown in FIG. 6 is recorded in a memory (not shown) of the camera 1 or the like. When a power switch (not shown) of the camera 1 is turned on, the process shown in FIG. 6 is executed by the control unit 34. In step S11, the control unit 34 performs an initial setting such as reading a value of a frame rate that is preset by the user. The process then proceeds to step S13. In step S13, the control unit 34 waits until the start of image-capturing is instructed by operation of a release button, for example. When the start of image-capturing is instructed, the control unit 34 starts photographing of a moving image under the image-capturing conditions in the initial setting. The process then proceeds to S15.

In step S15, the exposure calculation unit 34a of the control unit 34 detects brightness of a subject based on an image signal from the image sensor 33a and determines an exposure time, an ISO sensitivity, and a diaphragm value providing a proper exposure. The image-capturing operation under the determined exposure conditions is then performed and the process proceeds to step S17. In step S17, the moving velocity calculation unit 34b of the control unit 34 calculates a moving velocity of the camera 1 based on information on an acceleration of the camera 1 detected by the acceleration sensor 35. The process then proceeds to step S19.

In step S19, the image-capturing control unit 34c of the control unit 34 determines whether the moving velocity V of the camera 1 calculated in step S17 is less than a first predetermined value V1. If Yes in step S19, the process proceeds to step S21. In step 21, the control unit 34 controls the image-capturing unit 33 and the diaphragm 32 so as to capture an image without changing the exposure time, the ISO sensitivity, and the aperture value calculated in step S15. The process then proceeds to step S35.

If the moving velocity V of the camera 1 calculated in step S17 is equal to or more than the first predetermined value V1, the determination result in step S19 is No. The process then proceeds to step S23. In step S23, the image-capturing control unit 34c of the control unit 34 determines whether the moving velocity V of the camera 1 calculated in step S17 is equal to or more than a second predetermined value V2.

If the moving velocity V of the camera 1 calculated in step S17 is equal to or more than the second predetermined value V2, the determination result in step 23 is Yes and the process proceeds to step S25. In step S25, the image-capturing control unit 34c of the control unit 34 multiplies the exposure time calculated in step S15 by a factor b and the process proceeds to step S29.

If the moving velocity V of the camera 1 calculated in step S17 is less than the second predetermined value V2, the determination result in step 23 is No and the process proceeds to step S27. In step S27, the image-capturing control unit 34c of the control unit 34 multiplies the exposure time calculated in step S15 by a factor a (a<b) and the process proceeds to step S29.

In step S29, the image-capturing control unit 34c of the control unit 34 determines whether the exposure time calculated in step S25 or step S27 exceeds the upper limit value of the exposure time at the first frame rate. If the determination result in step 29 is Yes, the process proceeds to step S31. In step S31, the image-capturing control unit 34c of the control unit 34 changes the frame rate to a second frame rate that is lower than the first frame rate. The process then proceeds to step S33. If the exposure time calculated in step S25 or step S27 is equal to or less than the upper limit value of the exposure time at the first frame rate, the determination result in step S29 is No. The then process proceeds to step S33.

In step S33, the exposure calculation unit 34a of the control unit 34 changes the ISO sensitivity and the aperture value to achieve a proper exposure with the exposure time calculated (changed) in step S25 or step S27. The control unit 34 then controls the image-capturing unit 33 and the diaphragm 32 so as to capture an image with the changed exposure time, ISO sensitivity, and aperture value. The process then proceeds to step S35.

In step S35, the control unit 34 determines whether termination of the image-capturing of the moving image is instructed. If the determination result in step S35 is No, the process returns to step S15. If the determination result in step S35 is Yes, the process proceeds to step S37.

In step S37, the control unit 34 determines whether a power switch (not shown) is turned off. If the determination result in step S37 is No, the process returns to step S13. If the determination result in step S37 is Yes, the program ends.

The camera 1 according to the first embodiment has the following operational effects.

(1) The camera 1 includes an image sensor 33a capable of capturing a moving image; an acceleration sensor 35 and a moving velocity calculation unit 34b detecting a moving velocity V of the camera 1; and an image-capturing control unit 34c changing an exposure time of moving-image capturing of the image sensor 33a based on the moving velocity V detected by the acceleration sensor 35 and the moving velocity calculation unit 34b. Therefore, the exposure time can be extended as the moving velocity V of the camera 1 increases. As a result, the moving image is smoothly reproduced with an appropriate image blur, so that a viewer viewing the reproduced moving image can feel a sense of speed and enjoy a realistic sense of presence.

(2) As the moving velocity V detected by the acceleration sensor 35 and the moving velocity calculation unit 34b increases, the image-capturing control unit 34c extends the exposure time. As a result, the moving image is smoothly reproduced with an appropriate image blur, so that a viewer viewing the reproduced moving image can feel a sense of speed and enjoy a realistic sense of presence.

(3) As the moving velocity V detected by the acceleration sensor 35 and the moving velocity calculation unit 34b increases, the image-capturing control unit 34c extends the exposure time. When the moving velocity V further increases, the image-capturing control unit 34c reduces the frame rate of moving-image capturing and further extends the exposure time. Therefore, even when the moving velocity V of the camera 1 further increases, the exposure time can be further extended. As a result, even when the moving velocity V of the camera 1 further increases, an appropriate image blur is provided and the moving image obtained by image-capturing is reproduced smoothly. Thus, a viewer viewing the reproduced moving image can feel a sense of speed and enjoy a realistic sense of presence.

(4) When the exposure time is extended, the control unit 34 reduces the sensitivity of the image sensor 33a. As a result, the image can be captured with a proper exposure and thus a high quality of the image obtained by image-capturing is achieved.

(5) When the exposure time is extended, the control unit 34 reduces the aperture value of the diaphragm 32 of the image-capturing optical system. As a result, the image can be captured with a proper exposure and thus the image quality of the image obtained by image-capturing is improved.

Second Embodiment

A second embodiment of the image-capturing apparatus will be described with reference to FIGS. 7 and 8. In the following description, the same components as those in the first embodiment are denoted by the same reference numerals, and differences will mainly be described. Parts not specifically described are the same as in the first embodiment.

As described in the first embodiment, the exposure time has an upper limit value depending on the frame rate. Therefore, in the camera 1 according to the second embodiment, if the exposure time calculated based on the moving velocity V of the camera 1 exceeds the above-described upper limit value, a first image-capturing frame generated by image-capturing and a second image-capturing frame generated after the first image-capturing frame are synthesized. Here, the synthesis is, for example, an arithmetic mean of the first image-capturing frame and the second image-capturing frame. For example, a new image data item is obtained based on image signals obtained in two image-capturing frames that are temporally adjacent to each other. Specifically, the control unit 34 obtains a new image data item based on image signals obtained in two image-capturing frames that are temporally adjacent to each other as described below.

In the second embodiment, the image processing unit 34d of the control unit 34 can further perform an add process in which a first signal generated by the image sensor 33a in the first image-capturing frame and a second signal generated by the image sensor 33a in the second image-capturing frame which is captured subsequent to the first image-capturing frame are added to generate a new image data item.

Figure 7:
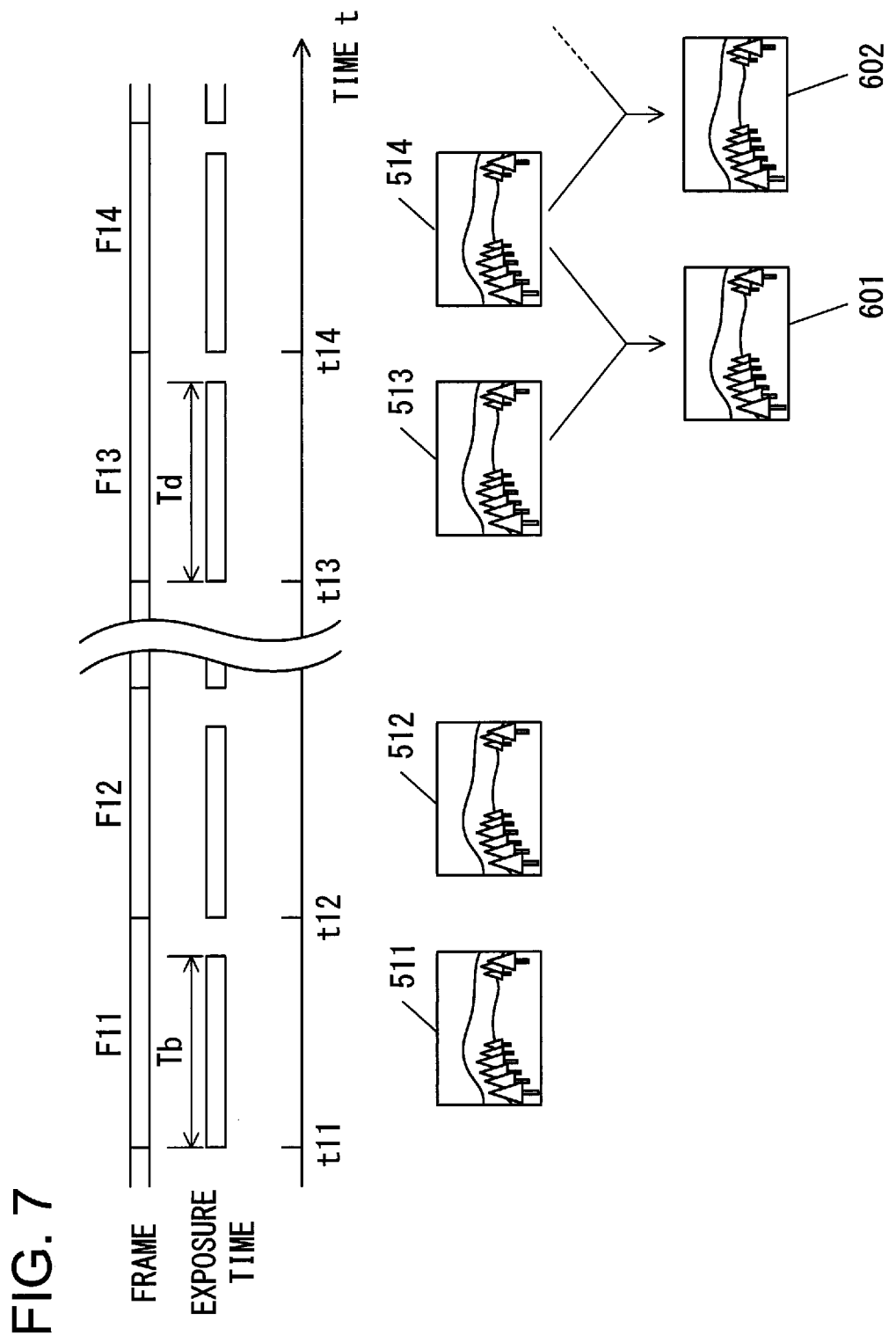
FIG. 7 is a diagram showing a relationship between frames, exposure times, images obtained by image-capturing in frames, and images obtained in the second embodiment.

FIG. 7 is a diagram showing a relationship between frames, exposure times, and images obtained by image-capturing in each frame, and images obtained in the present embodiment. If the exposure time calculated based on the moving velocity V of the camera 1 is equal to or less than the above-described upper limit value, the control unit 34 of the camera 1 in the second embodiment performs the same process as in the first embodiment. For example, it is assumed that, at time points t11, t12, the moving velocity V of the camera 1 is equal to or more than the first predetermined value V1; and in each of the frames F11, F12 in which exposure starts at the time points t11, t12, the exposure time is changed to be an exposure time Tb that is longer than the exposure time Ta determined by the exposure calculation unit 34a. Here, it is assumed that the exposure time Tb in the frames F11, F12 is equal to or less than the upper limit value of the exposure time at the first frame rate. In image-capturing in the frame F11, an image data item of an image 511 is obtained. In image-capturing in the frame F12, an image data item of an image 512 is obtained.

The following description relates to a case where the moving velocity V of the camera 1 further increases between time points t12 and t13 to be equal to or more than the second predetermined value V2, for example, and the exposure time calculated based on the moving velocity V of the camera 1 exceeds the upper limit value of the exposure time at the first frame rate. In this case, the image-capturing control unit 34c sets the exposure time Td of the frame F13 and the next frame F14 to the upper limit value of the exposure time at the first frame rate. An image data item of the image 513 is obtained in image-capturing in the frame F13 and an image data item of the image 514 is obtained in image-capturing in the frame F14.

The image processing unit 34d performs an add process of adding the image data item of the image 513 obtained by image-capturing in the frame F13 and the image data item of the image 514 obtained by image-capturing in the frame F14 to generate an image data item of the image 601. Note that when the image data item of the image 601 is generated, only simple addition of the image data item of the image 513 and the image data item of the image 514 may lead to an excessively bright and insufficient image 601 obtained by the addition. Thus, when adding the image data item of the image 513 obtained by image-capturing in the frame F13 and the image data item of the image 514 obtained by image-capturing in the frame F14, the image processing unit 34d desirably multiplies signal values of the image data items of the images 513, 514 by a factor 0.5 and then perform a process for adding these image data items. Note that the image processing unit 34d may calculate an average value of the image data item of the image 513 obtained by image-capturing in the frame F13 and the image data item of the image 514 obtained by image-capturing in the frame F14 to generate an image data item of the image 601.

If the moving velocity V of the camera 1 remains equal to or more than the second predetermined value V2, the image-capturing control unit 34c sets the exposure time Td of a frame subsequent to the frame F14 to the upper limit value of the exposure time at the first frame rate. The image processing unit 34d performs an add process of adding the image data item of the image 514 obtained by image-capturing in the frame F14 and the image data item of the image obtained by image-capturing in the frame subsequent to the frame F14 to generate an image data item of the image 602.

In this way, generating one image data item from image data items of two image-capturing frames provides a moving image having an appropriate image blur. As a result, the moving image is smoothly reproduced, so that a viewer viewing the reproduced moving image can feel a sense of speed and enjoy a realistic sense of presence.

Figure 8:
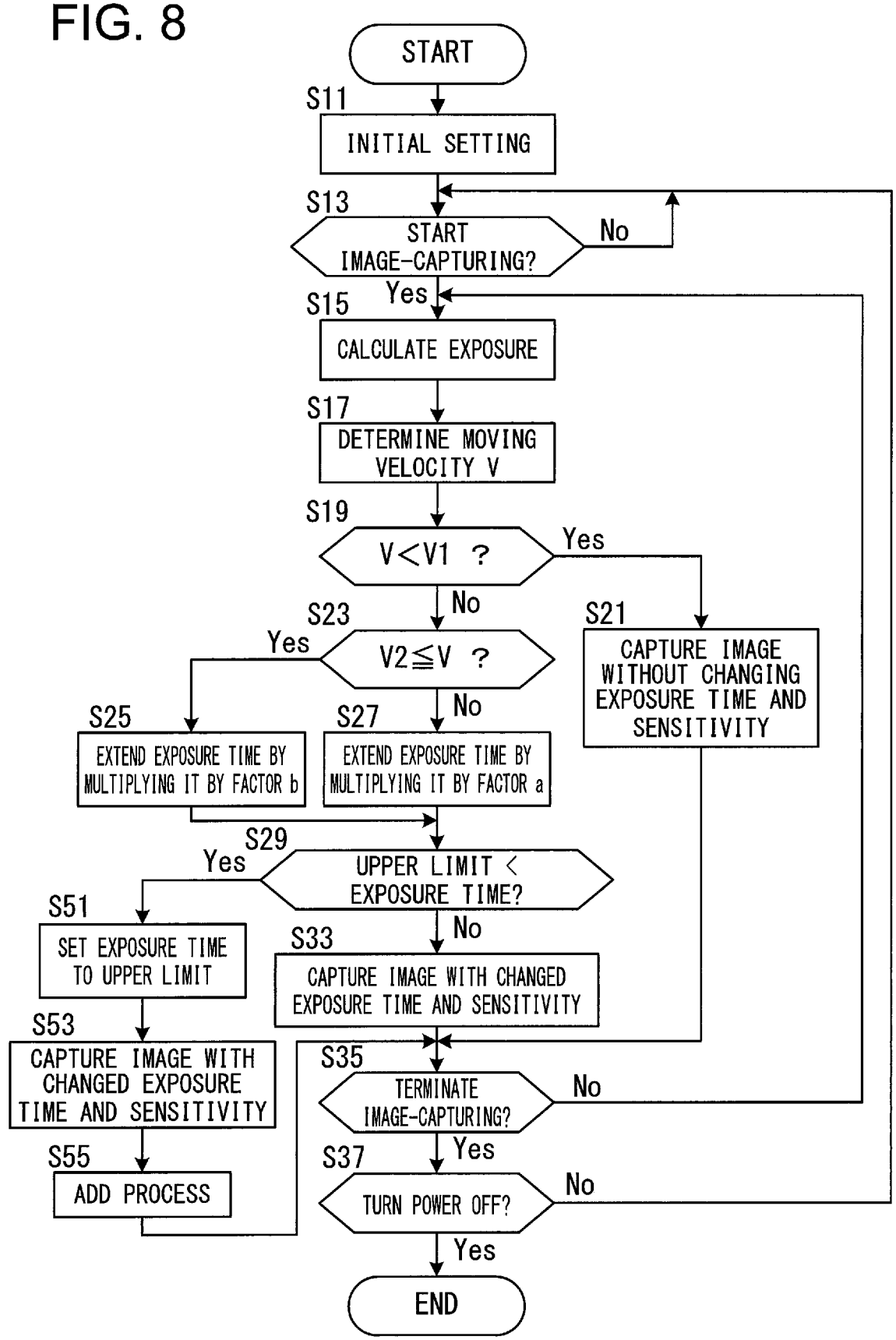
FIG. 8 is a flowchart showing a process relating to image-capturing by the camera according to the second embodiment.

FIG. 8 is a flowchart showing a process relating to image-capturing by the camera 1 according to the second embodiment. A process relating to image-capturing by the camera 1 according to the second embodiment is the same as the process shown in the flowchart in the first embodiment shown in FIG. 6, except for a process step after the determination result in step S29 is Yes.

If the determination result in step S29 is Yes, the process proceeds to step S51. In step S51, the image-capturing control unit 34c of the control unit 34 sets the exposure time to the upper limit value of the exposure time at the first frame rate. The process then proceeds to step S53. In step S53, the exposure calculation unit 34a of the control unit 34 changes the ISO sensitivity and the aperture value to achieve a proper exposure with the exposure time set (changed) in step S51. The control unit 34 then controls the image-capturing unit 33 and the diaphragm 32 so as to capture an image with the changed exposure time, ISO sensitivity, and aperture value.

The process then proceeds to step S35. In step S55, the image processing unit 34d of the control unit 34 performs the add process described above. The process then proceeds to step S35.

The camera 1 according to the second embodiment has the following operational effects, in addition to the operational effects as in the first embodiment.

(1) The camera 1 further includes the image processing unit 34d that adds a first signal generated by the image sensor 33a in the first image-capturing frame and a second signal generated by the image sensor 33a in the second image-capturing frame which is captured subsequent to the first image-capturing frame. When the moving velocity V detected by the acceleration sensor 35 and the moving velocity calculation unit 34b increases, the image-capturing control unit 34c extends the exposure time. When the moving velocity V further increases, the image processing unit 34d adds the first signal and the second signal.

Thus, generating one image data item from image data items of two image-capturing frames provides a moving image having an appropriate image blur. As a result, the moving image is smoothly reproduced, so that a viewer viewing the reproduced moving image can feel a sense of speed and enjoy a realistic sense of presence.

Third Embodiment

A third embodiment of the image-capturing apparatus will be described with reference to FIGS. 9 and 10. In the following description, the same components as those in the first and second embodiments are designated by the same reference numerals, and differences will mainly be described. Features not specifically described are the same as in the first and second embodiments.

As described in the first embodiment, the exposure time has an upper limit value depending on the frame rate. Thus, in the camera 1 according to the third embodiment, if the exposure time calculated based on the moving velocity V of the camera 1 exceeds the above-described upper limit value, an image blur is added to an image data item obtained by image-capturing in a certain image-capturing frame by referring to an image data item obtained by image-capturing in the next image-capturing frame. Specifically, the control unit 34 obtains a new image data item based on image signals obtained in two image-capturing frames that are temporally adjacent to each other as described below.

In the third embodiment, the image processing unit 34d of the control unit 34 can further perform an image blur addition process for adding image blur to a first signal generated by the image sensor 33a in the first image-capturing frame based on a second signal generated by the image sensor 33a in the second image-capturing frame captured subsequent to the first image-capturing frame.

Figure 9:
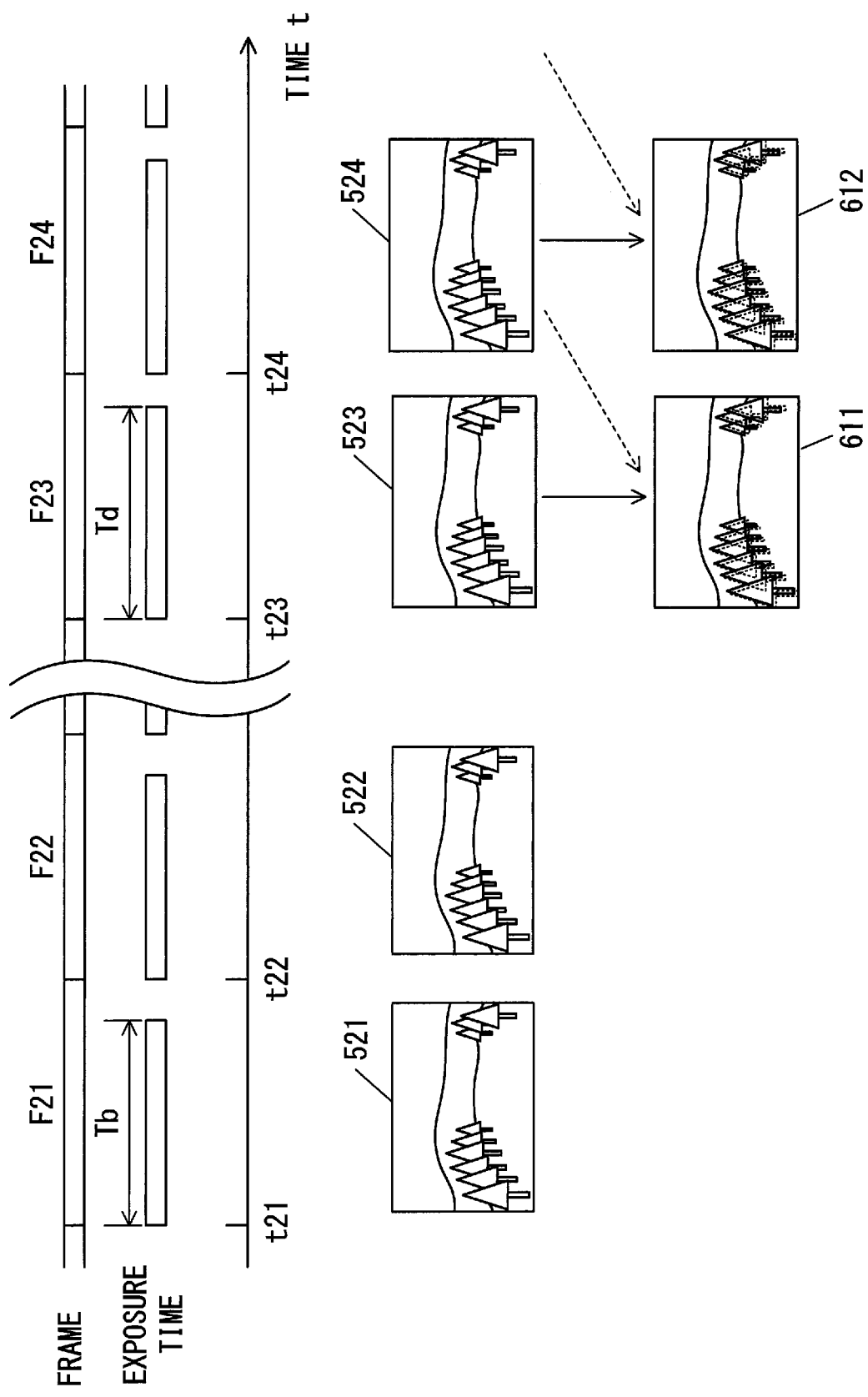
FIG. 9 is a diagram showing a relationship between frames, exposure times, images obtained by image-capturing in frames, and images obtained in the third embodiment.

FIG. 9 is a diagram showing a relationship between frames, exposure times, and images obtained by image-capturing in each frame, and images obtained in the present embodiment. If the exposure time calculated based on the moving velocity V of the camera 1 is equal to or less than the above-described upper limit value, the control unit 34 of the camera 1 in the third embodiment performs the same process as in the first embodiment. For example, at time points t21, t22, the moving velocity V of the camera 1 is equal to or more than the first predetermined value V1. In each of the frames F21, F22 in which exposure starts at the time points t21, t22, the exposure time is changed to be an exposure time Tb that is longer than the exposure time Ta determined by the exposure calculation unit 34a. Here, it is assumed that the exposure time Tb in the frames F21, F22 is equal to or less than the upper limit value of the exposure time at the first frame rate. In image-capturing in the frame F21, an image data item of an image 521 is obtained. In image-capturing in the frame F22, an image data item of an image 522 is obtained.

The following description relates to a case where the moving velocity V of the camera 1 further increases between time points t22 and t23 to be equal to or more than the second predetermined value V2, for example, and the exposure time calculated based on the moving velocity V of the camera 1 exceeds the upper limit value of the exposure time at the first frame rate. In this case, the image-capturing control unit 34c sets the exposure time Td of the frame F23 and the next frame F24 to the upper limit value of the exposure time at the first frame rate. An image data item of the image 523 is obtained in image-capturing in the frame F23 and an image data item of the image 524 is obtained in image-capturing in the frame F24.

The image processing unit 34d adds an image blur to the image data item of the image 523 based on the image data item of the image 523 obtained by image-capturing in the frame F23 and the image data item of the image 524 obtained by image-capturing in the frame F24, as described below. The image processing unit 34d compares the image data item of the image 523 obtained by image-capturing in the frame F23 with the image data item of the image 524 obtained by image-capturing in the frame F24 to calculate an image movement amount X in the image 523 per unit time. Then, the image processing unit 34d calculates a product of the movement amount X and the exposure time calculated based on the moving velocity V of the camera 1, that is, an image blur amount of the image 523 when assuming that exposure is performed for the exposure time calculated based on the moving velocity V of the camera 1. Then, the image processing unit 34d performs image processing of adding an image blur corresponding to the calculated image blur amount to the image 523. As a result, an image data item of the image 611 is obtained, which has the image blur similar to that obtained in a case where exposure is performed for the exposure time calculated based on the moving velocity V of the camera 1.

If the moving velocity V of the camera 1 remains equal to or more than the second predetermined value V2, the above-described image blur addition process is also performed on the image 524 obtained by image-capturing in the frame F24. That is, the image processing unit 34d generates an image data item of the image 612, which is obtained by adding an image blur to the image data item of the image 524 based on the image data item of the image 524 obtained by image-capturing in the frame F24 and an image data item of an image obtained by image-capturing in a frame subsequent to the frame F24.

In this way, a moving image having an appropriate image blur can be obtained by generating an image data item having an image blur added thereto based on image data items of two temporally adjacent image-capturing frames. As a result, the moving image is smoothly reproduced, so that a viewer viewing the reproduced moving image can feel a sense of speed and enjoy a realistic sense of presence.

Figure 10:
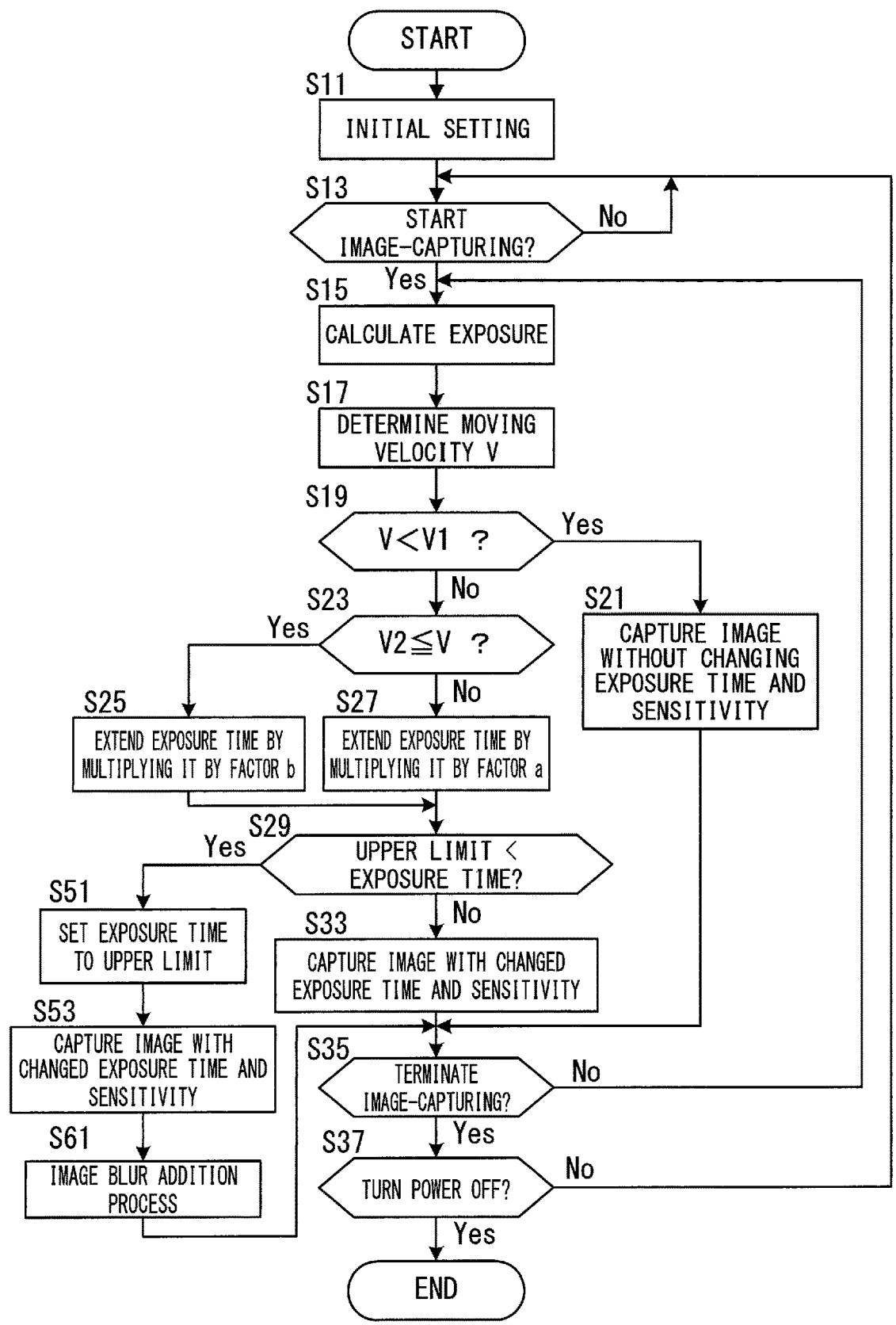
FIG. 10 is a flowchart showing a process relating to image-capturing by the camera according to the third embodiment.

FIG. 10 is a flowchart showing a process relating to image-capturing by the camera 1 according to the third embodiment. The process relating to image-capturing by the camera 1 according to the third embodiment is the same as the process shown in the flowchart in the second embodiment shown in FIG. 8, except that a process step S61 is performed instead of the process step S55 in FIG. 8.

After step S53 is executed, the process proceeds to step S61. In step S61, the image processing unit 34d of the control unit 34 performs the above-described image blur addition process. The process then proceeds to step S35.

The camera 1 according to the third embodiment has the following operational effects, in addition to those of the embodiments described above.

(1) The camera 1 includes an image processing unit 34d that performs image processing on a signal generated by the image sensor 33a. When the moving velocity V detected by the acceleration sensor 35 and the moving velocity calculation unit 34b increases, the image-capturing control unit 34c extends the exposure time. The image processing unit 34d performs image processing for adding image blur when the moving velocity V further increases.

Thereby, a moving image having an appropriate image blur can be obtained. The moving image thus obtained is smoothly reproduced with an appropriate image blur, so that a viewer viewing the reproduced moving image can feel a sense of speed and enjoy a realistic sense of presence.

Fourth Embodiment

A fourth embodiment of an image-capturing apparatus will be described with reference to FIGS. 11 to 14. In the following description, the same components as those in the first embodiment are designated by the same reference numerals, and differences will mainly be described. Parts not specifically described are the same as in the first embodiment. The fourth embodiment differs from the first embodiment mainly in that an angle of view of a moving image is changed when the moving velocity V of the camera 1 increases, instead of extending the exposure time.

Figure 11:
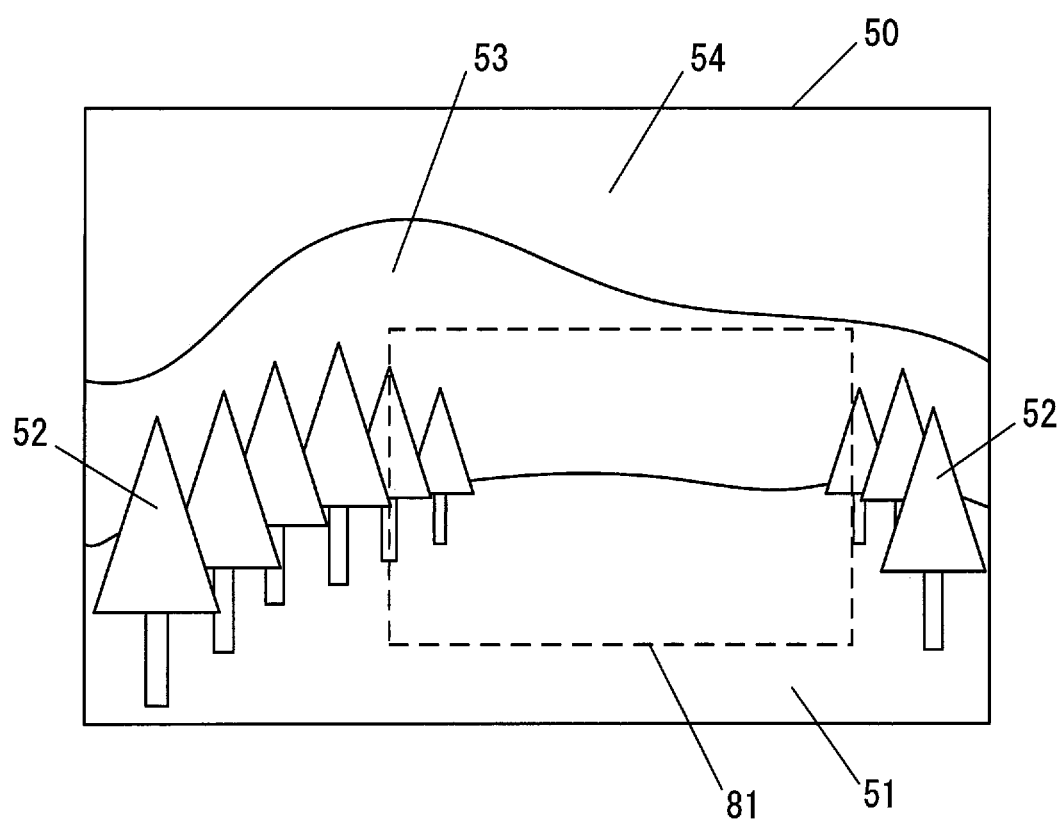
FIG. 11 is a view for explaining a field of view of the skier.

Generally, a field of view of a human tends to become smaller as the moving velocity of the human becomes faster. FIG. 11 is a view similar to FIG. 3, showing an example of an image in a frame of a moving image captured by a camera 1 attached to the head of the person shown in FIG. 2. With the camera 1, a range indicated in the image 50 is captured. However, as the skier skis down at a higher speed, a field of view of the skier becomes smaller to a range indicated by a frame 81, for example.

Therefore, in the camera 1 according to the fourth embodiment, a range of a moving image to be reproduced is made smaller as the moving velocity V of the camera 1 increases, so that a viewer of the moving image can view a moving image similar to the field of view of the skier. That is, in the camera 1 according to the fourth embodiment, when the moving velocity V of the camera 1 increases, only a part of an image obtained by image-capturing is cut out, and the cut-out image is enlarged and recorded. In this way, in the camera 1 according to the fourth embodiment, a range of the moving image captured and recorded become smaller as the moving velocity V of the camera 1 increases.

Figure 12:
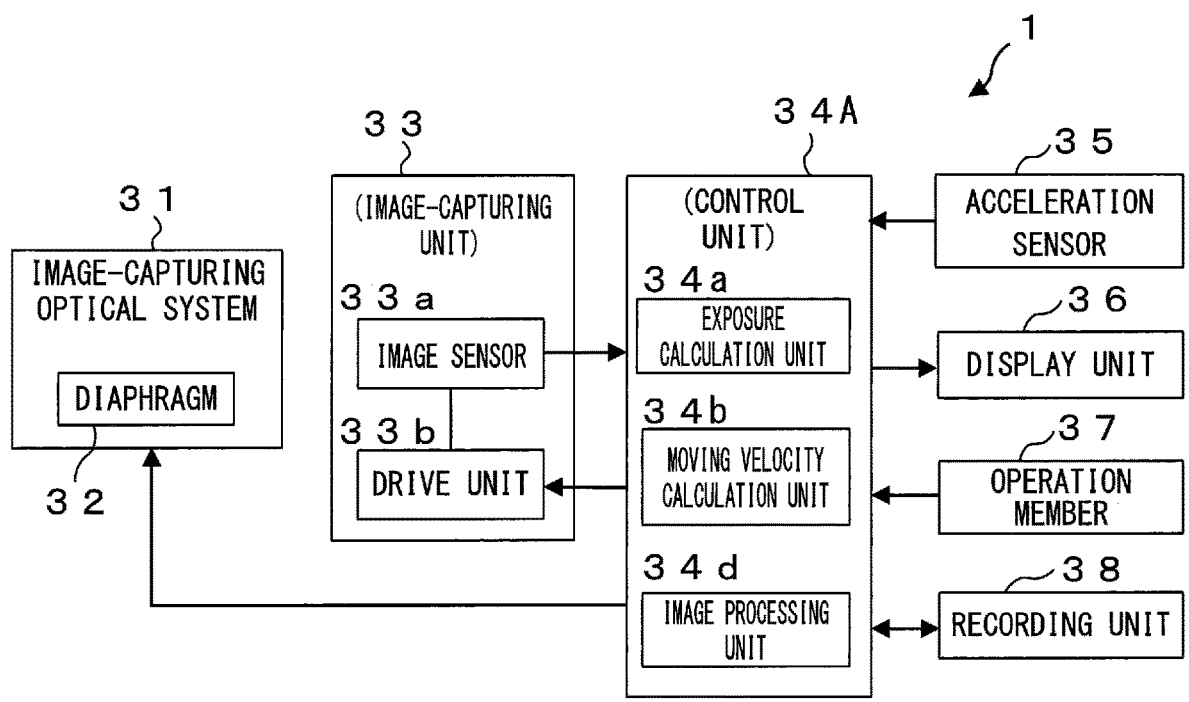
FIG. 12 is a block diagram showing a configuration of a camera according to a fourth embodiment.

FIG. 12 is a block diagram showing a configuration of the camera 1 according to the fourth embodiment. The control unit 34A includes an exposure calculation unit 34a, a moving velocity calculation unit 34b, and an image processing unit 34d. The image processing unit 34d can further perform a cropping process and an enlarging process.

The cropping process is a process of cropping a part of an image obtained by image-capturing. In the following description, a region cut out by the cropping process is referred to as a cropped region. For example, the image processing unit 34d sets a range surrounded by the frame 81 as a cropped region, in the image 50 of FIG. 11 obtained by image-capturing.

Note that a central position of the cropped region may be a central position of the image obtained by image-capturing or may be a position determined based on the moving direction of the camera 1. Note that, for convenience of the enlarging process described later, the cropped region desirably has a rectangular shape having the same aspect ratio as that of the image obtained by image-capturing. The shape is, however, not limiting thereto. For example, the cropped region may have a circular shape, an elliptical shape, or any other shape.

If the moving velocity V of the camera 1 is equal to or more than the first predetermined value V1 and less than the second predetermined value V2, the image processing unit 34*d* sets a first cropped region for the image obtained by image-capturing. If the moving velocity V of the camera 1 is equal to or more than the second predetermined value V2, the image processing unit 34*d* sets a second cropped region that is smaller than the first cropped region.

The enlarging process is a process of enlarging the image of the cropped region cropped by the above-described cropping process to a size of an original image before the cropping process.

The image processing unit 34*d* handles an image data item of the image obtained by the cropping process and the enlarging process described above, instead of the image data item of the image obtained by image-capturing, as an image data item for recording.

Note that when the moving velocity V of the camera 1 calculated by the moving velocity calculation unit 34*b* is less than the first predetermined value V1, the image processing unit 34*d* handles the image data item of the image obtained by image-capturing as the image data item for recording, without performing the cropping process and the enlarging process described above. Note that when a captured and cropped image is recorded, the image may be recorded without the enlarging process of the moving image generated by cropping.

Figure 13:
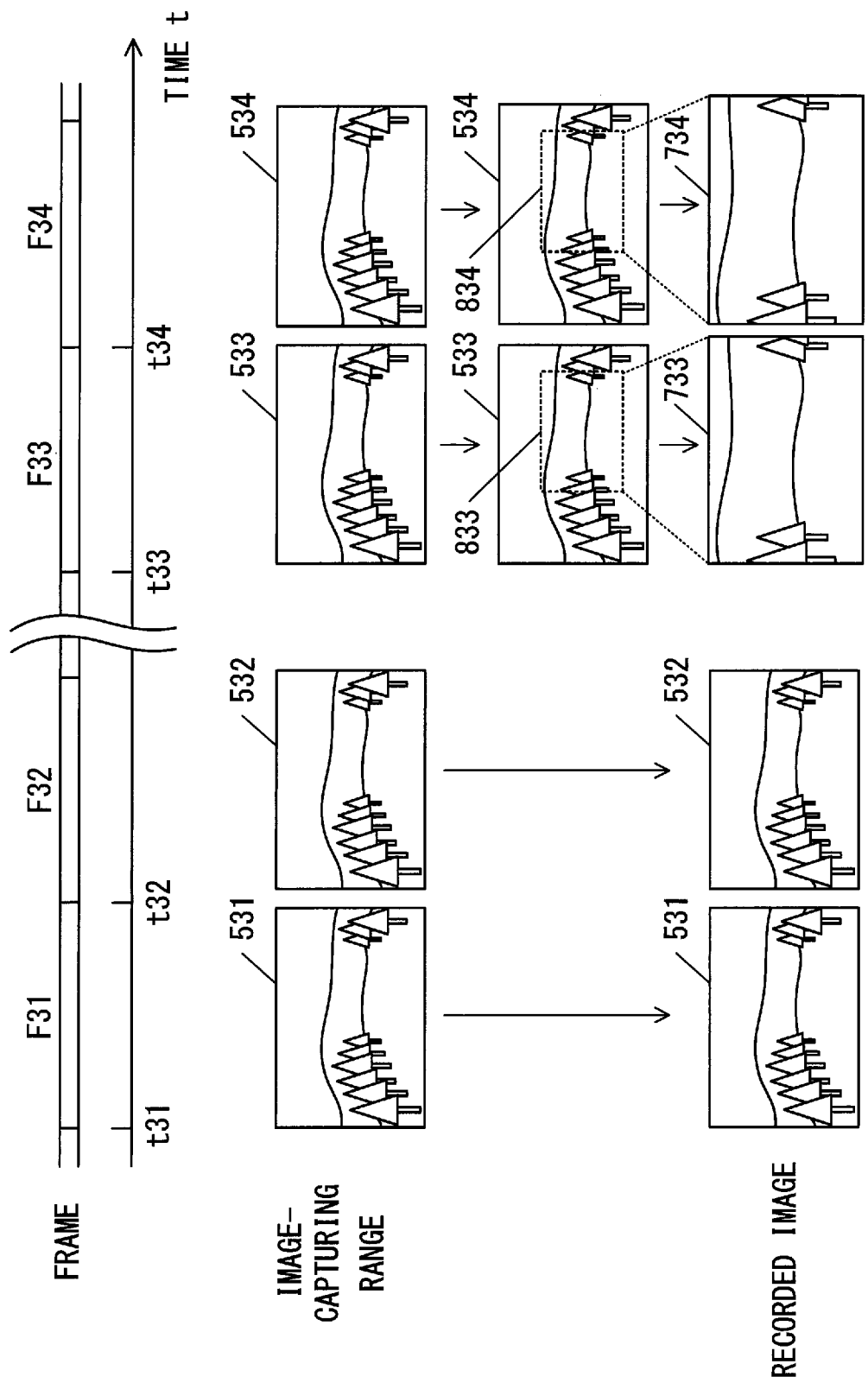
FIG. 13 is a diagram showing a relationship between images obtained by image-capturing in frames and images obtained in the fourth embodiment.

FIG. 13 is a diagram showing a relationship between images obtained by image-capturing in frames and images obtained in the present embodiment.

It is assumed that, at time points t31 to t32, the moving velocity V of the camera 1 is less than the first predetermined value V1. In this case, the image processing unit 34*d* does not perform the cropping process and the enlarging process, which are described above, on images 531, 532 obtained by image-capturing in the frames F31, F32 at which exposure starts from the time points t31, t32. The image processing unit 34*d* handles image data items of the images 531, 532 obtained by image-capturing in the frames F31, F32 as image data items for recording.

The following description relates to a case where the moving velocity V of the camera 1 increases between time points t32 and t33 to be equal to or more than the first predetermined value V1, for example. In this case, the image processing unit 34*d* performs the above-described cropping process and enlarging process on the image 533 obtained by image-capturing in the frame F33 at which exposure starts at the time point t33. That is, the image processing unit 34*d* sets a cropped region 833 on the image 533 obtained by image-capturing in the frame F33 at which exposure starts at the time point t33, and cuts out the set cropped region 833.

Note that if the moving velocity V of the camera 1 is equal to or more than the first predetermined value V1 and less than the second predetermined value V2, the image processing unit 34*d* sets a first cropped region for the image 533. Furthermore, if the moving velocity V of the camera 1 is equal to or more than the second predetermined value V2, the image processing unit 34*d* sets a second cropped region for the image 533.

Then, the image processing unit 34*d* performs a process of enlarging the image of the cropped region 833 to the size of the original image 533 before the cropping process to obtain an image data item of the image 733. The image processing unit 34*d* handles the image data item of the image 733 as an image data item for recording in the frame F33.

If the moving velocity V of the camera 1 is equal to or more than the first predetermined value V1 between the time point t33 and the time point t34, the image processing unit 34*d* performs the above-described cropping process and the enlarging process also on an image 534 obtained by image-capturing in the Frame F34 at which exposure starts at a time point t34. That is, the image processing unit 34*d* sets a cropped region 834 on the image 534 and cuts out the set cropped region 834. Then, the image processing unit 34*d* performs a process of enlarging the image of the cropped region 834 to the size of the original image 534 before the cropping process to obtain an image data item of the image 734. The image processing unit 34*d* handles the image data item of the image 734 as an image data item for recording in the frame F34.

In this way, a range of the recorded image becomes smaller when the moving velocity V of the camera 1 increases. Therefore, when viewing the moving image captured by the camera 1 according to the present embodiment, a viewer feels that the field of view is smaller as the moving velocity of the camera 1 increases. This can prevent a reduction in a sense of speed, thereby giving a viewer viewing the moving image a realistic sense of presence.

Figure 14:
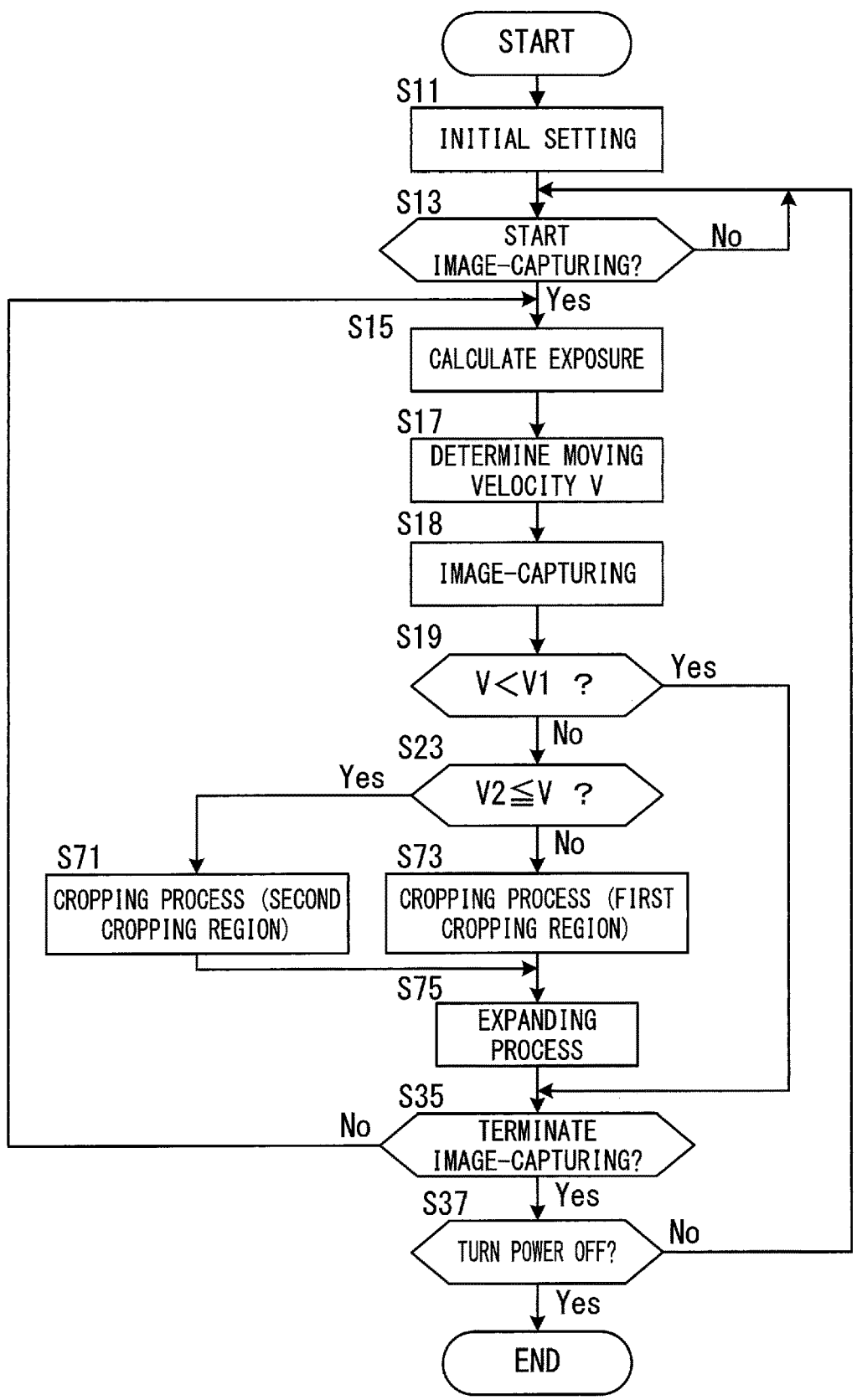
FIG. 14 is a flowchart showing a process relating to image-capturing by the camera according to the fourth embodiment.

FIG. 14 is a flowchart showing a process relating to image-capturing by the camera 1 according to the fourth embodiment. When a power switch (not shown) of the camera 1 is turned on, the process shown in FIG. 14 is executed by the control unit 34. Steps S11 to S17 are the same as those in the first embodiment shown in FIG. 6.

After step S17 is executed, the process proceeds to step S18. In step S18, the control unit 34 controls the image-capturing unit 33 and the diaphragm 32 so as to capture an image with the exposure time, the ISO sensitivity, and the aperture value calculated in step S15. The process then proceeds to step S19. In step S19, the image-capturing control unit 34*c* of the control unit 34 determines whether the moving velocity V of the camera 1 calculated in step S17 is less than a first predetermined value V1. If the determination result is Yes in step S19, the process proceeds to step S35. The process steps after step S35 are the same as those in the first embodiment shown in FIG. 6.

If the moving velocity V of the camera 1 calculated in step S17 is equal to or more than the first predetermined value V1, the determination result in step S19 is No. The process then proceeds to step S23. In step S23, the image-capturing control unit 34*c* of the control unit 34 determines whether the moving velocity V of the camera 1 calculated in step S17 is equal to or more than a second predetermined value V2.

If the moving velocity V of the camera 1 calculated in step S17 is equal to or more than the second predetermined value V2, the determination result in step S23 is Yes and the process proceeds to step S71. In step S71, the image-capturing control unit 34*c* of the control unit 34 performs the cropping process for cutting out the second cropped region as described above. The process then proceeds to step S75.

If the moving velocity V of the camera 1 calculated in step S17 is less than the second predetermined value V2, the determination result in step S23 is No and the process proceeds to step S73. In step S73, the image-capturing control unit 34c of the control unit 34 performs the cropping process for cutting out the first cropped region as described above. The process then proceeds to step S75.

In step S75, the image processing unit 34d of the control unit 34 performs the above-described enlarging process on the image of the cropped region cut out by the cropping process in step S71 or step S73. The process then proceeds to step S35.

The camera 1 according to the fourth embodiment has the following operational effects, in addition to those of the embodiments described above.

(1) The camera 1 includes an image processing unit 34d that performs image processing on a signal generated by the image sensor 33a. When the moving velocity V detected by the acceleration sensor 35 and the moving velocity calculation unit 34b increases, the image processing unit 34d cuts out only a part of the image obtained by image-capturing and enlarges the cut-out image. The recording unit 38 records the image enlarged by the image processing unit 34d. When viewing the moving image captured by the camera 1 according to the present embodiment, a viewer feels that the field of view is smaller as the moving velocity of the camera 1 increases. This can prevent a reduction in a sense of speed, thereby giving a viewer viewing the moving image a realistic sense of presence.

Fifth Embodiment

Figure 15:
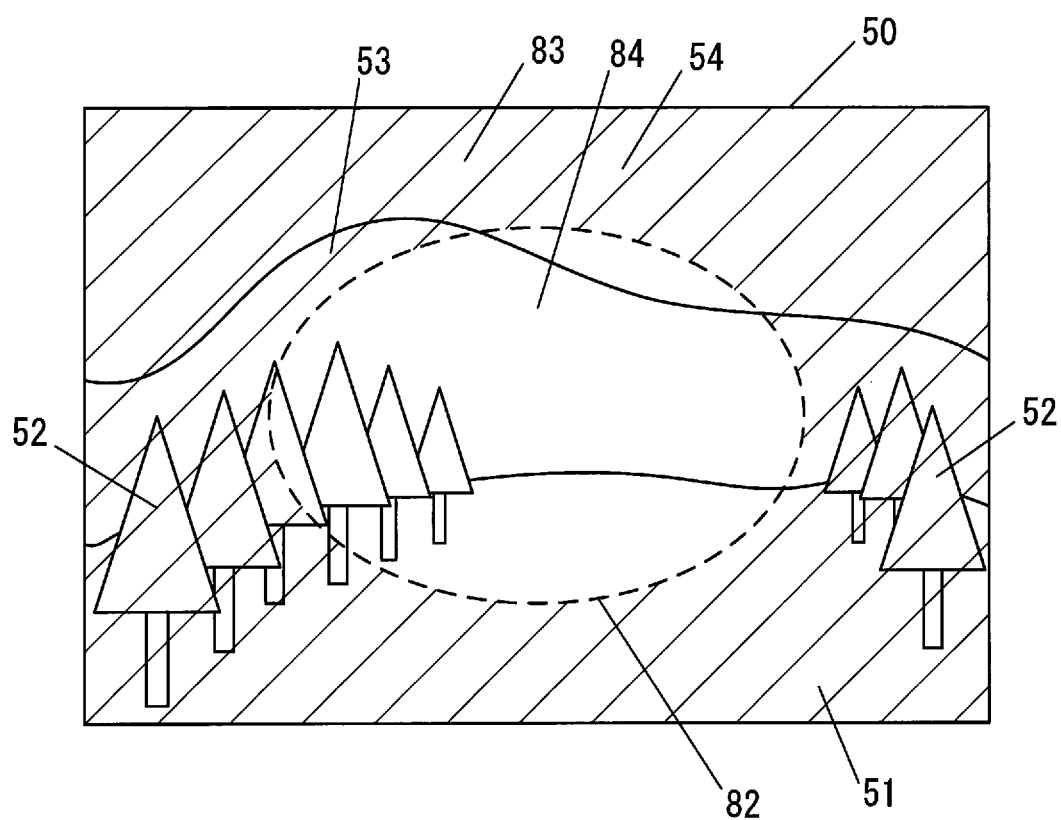
FIG. 15 is a view for explaining a process target region and a non-target region.

A fifth embodiment of the image-capturing apparatus will be described with reference to FIGS. 15 and 16. In the following description, the same components as those in the first and fourth embodiments are designated by the same reference numerals, and differences will mainly be described. Features not specifically described are the same as in the first and fourth embodiments. The fifth embodiment mainly differs from the fourth embodiment in that image sharpness of the peripheral part of the image is reduced as the moving velocity V of the camera 1 increases, instead of changing the angle of view of the moving image.

As described above, a field of view of a human tends to become smaller as the moving velocity of the human becomes faster. Therefore, in the camera 1 according to the fifth embodiment, in order to allow a viewer to view a moving image similar to the field of view of the skier, the sharpness of the peripheral part of the image obtained by image-capturing is reduced as the moving velocity V of the camera 1 increases.

The configuration of the camera 1 according to the fifth embodiment is the same as that of the camera 1 according to the fourth embodiment shown in FIG. 12. Note that in the camera 1 according to the fifth embodiment, the image processing unit 34d of the control unit 34A may perform a sharpness reduction process for reducing sharpness of a peripheral part of an image, instead of the cropping process and the enlarging process. The sharpness reduction process will be described below.

In the present embodiment, the sharpness reduction process is a process of performing at least one of the following processes (a) to (d) on a region on the peripheral side of the image obtained by image-capturing:
(a) blur the image, e.g., blur the image contour;
(b) reduce contrast;
(c) reduce saturation; and
(d) reduce brightness.

In the following description, a region subjected to the sharpness reduction process is referred to as a process target region, and a region not subjected to the sharpness reduction process is referred to as a non-target region. FIG. 15 is a view for explaining the process target region and the non-target region. For example, the image processing unit 34d sets a hatched region outside a frame 82 as a process target region 83 in an image 50 obtained by image-capturing. A region inside the frame 82 is a non-target region 84. Note that the frame 82 and the hatching lines in FIG. 15 are illustrated for convenience of explanation and they do not appear when the image 50 is reproduced.

Note that a central position of the non-target region 84 may be a central position of the image obtained by image-capturing or may be a position determined based on the moving direction of the camera 1. The shape of the non-target region 84 may also be an elliptical shape as shown in FIG. 15, a circular shape, a rectangular shape, or a closed shape made up of straight lines or curved lines.

If the moving velocity V of the camera 1 is equal to or more than the first predetermined value V1 and less than the second predetermined value V2, the image processing unit 34d sets a first cropped region for the image obtained by image-capturing. Further, if the moving velocity V of the camera 1 is equal to or more than the second predetermined value V2, the image processing unit 34d sets a second process target region that is larger than the first process target region. That is, the image processing unit 34d sets the process target region 83 so that the process target region 83 becomes larger, in other words, the non-target region 84 becomes smaller as the moving velocity V of the camera 1 increases. Then, the image processing unit 34d performs the sharpness reduction process described above on the set process target region.

Note that the image processing unit 34d may perform the sharpness reduction process so that the entire process target region becomes uniformly unsharp or may perform the sharpness reduction process so that sharpness is lower as the distance from the non-target region becomes higher. Specifically, the image processing unit 34b increases the degree of blurring the image as the distance from the non-target region increases. Further, for example, the image processing unit 34b may reduce at least one of contrast, saturation, and brightness as the distance from the non-target region becomes larger. Only one of the blurring, the contrast reduction, the saturation reduction, and the brightness reduction may be performed, or two or more of them may be performed in combination.

The image processing unit 34d handles an image data item of the image obtained by the above-described sharpness reduction process as an image data item for recording, instead of the image data item of the image obtained by image-capturing.

Note that when the moving velocity V of the camera 1 calculated by the moving velocity calculation unit 34b is less than the first predetermined value V1, the image processing unit 34d handles the image data item of the image obtained by image-capturing as the image data item for recording, without performing the above-described sharpness reduction process.

In this way, sharpness of the peripheral part of the recorded image becomes lower as the moving velocity V of the camera 1 increases. Therefore, when viewing the moving image captured by the camera 1 according to the present embodiment, a viewer feels that the field of view is smaller as the moving velocity of the camera 1 increases. This can prevent a reduction in a sense of speed, thereby giving a viewer viewing the moving image a realistic sense of presence.

Figure 16:
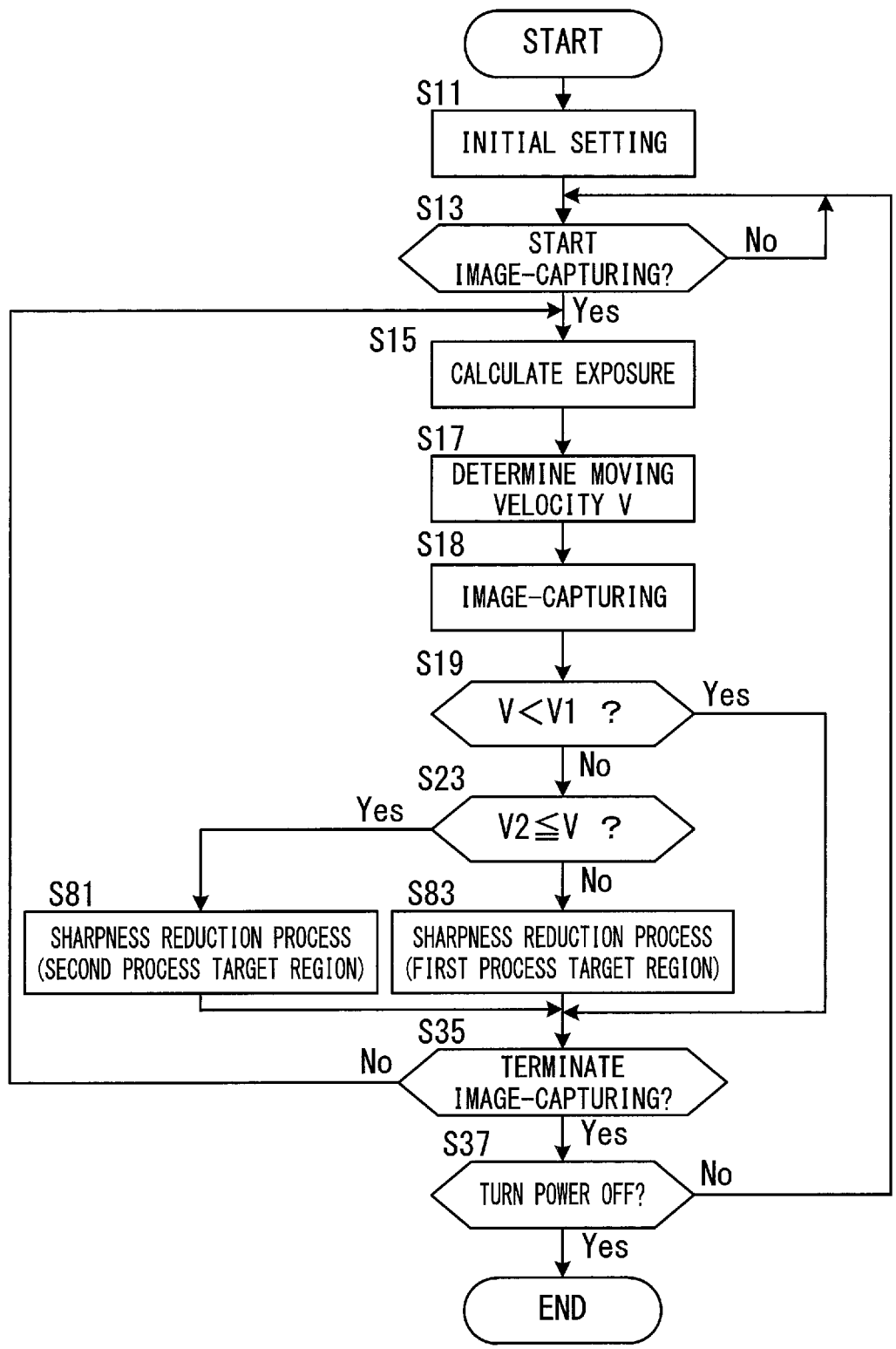
FIG. 16 is a flowchart showing a process relating to image-capturing by the camera according to the fifth embodiment.

FIG. 16 is a flowchart showing a process relating to image-capturing by the camera 1 according to the fifth embodiment. When a power switch (not shown) of the camera 1 is turned on, the process shown in FIG. 16 is executed by the control unit 34. Steps S11 to S23 are the same as those in the fourth embodiment shown in FIG. 14.

In step S23, the image-capturing control unit 34c of the control unit 34 determines whether the moving velocity V of the camera 1 calculated in step S17 is equal to or more than a second predetermined value V2.

If the moving velocity V of the camera 1 calculated in step S17 is equal to or more than the second predetermined value V2, the determination result in step S23 is Yes and the process proceeds to step S81. In step S81, the image-capturing control unit 34c of the control unit 34 sets the second process target region as described above to perform the sharpness reduction process. The process then proceeds to step S75.

If the moving velocity V of the camera 1 calculated in step S17 is less than the second predetermined value V2, the determination result in step S23 is No and the process proceeds to step S83. In step S83, the image-capturing control unit 34c of the control unit 34 sets the first process target region as described above to perform the sharpness reduction process. The process then proceeds to step S35.

The camera 1 according to the fifth embodiment has the following operational effects, in addition to those of the embodiments described above.

(1) The camera 1 includes an image processing unit 34d that performs image processing on a signal generated by the image sensor 33a. The image processing unit 34d performs the sharpness reduction process for reducing the sharpness of the peripheral part of the image obtained by image-capturing as the moving velocity V detected by the acceleration sensor 35 and the moving velocity calculation unit 34b increases. The recording unit 38 records the image subjected to the sharpness reduction process.

When viewing the moving image captured by the camera 1 according to the present embodiment, a viewer feels that the field of view is smaller as the moving velocity of the camera 1 increases. This can prevent a reduction in a sense of speed, thereby giving a viewer viewing the moving image a realistic sense of presence.

The following modifications are also within the scope of the present invention, and one or more of the modifications may also be combined with the above-described embodiments.

First Modification

In each of the above-described embodiments, a camera shake correction function has not been specifically mentioned. The camera 1 according to the first modification further includes a camera shake correction function in addition to functions of the camera 1 according to the first embodiment.

Figure 17:
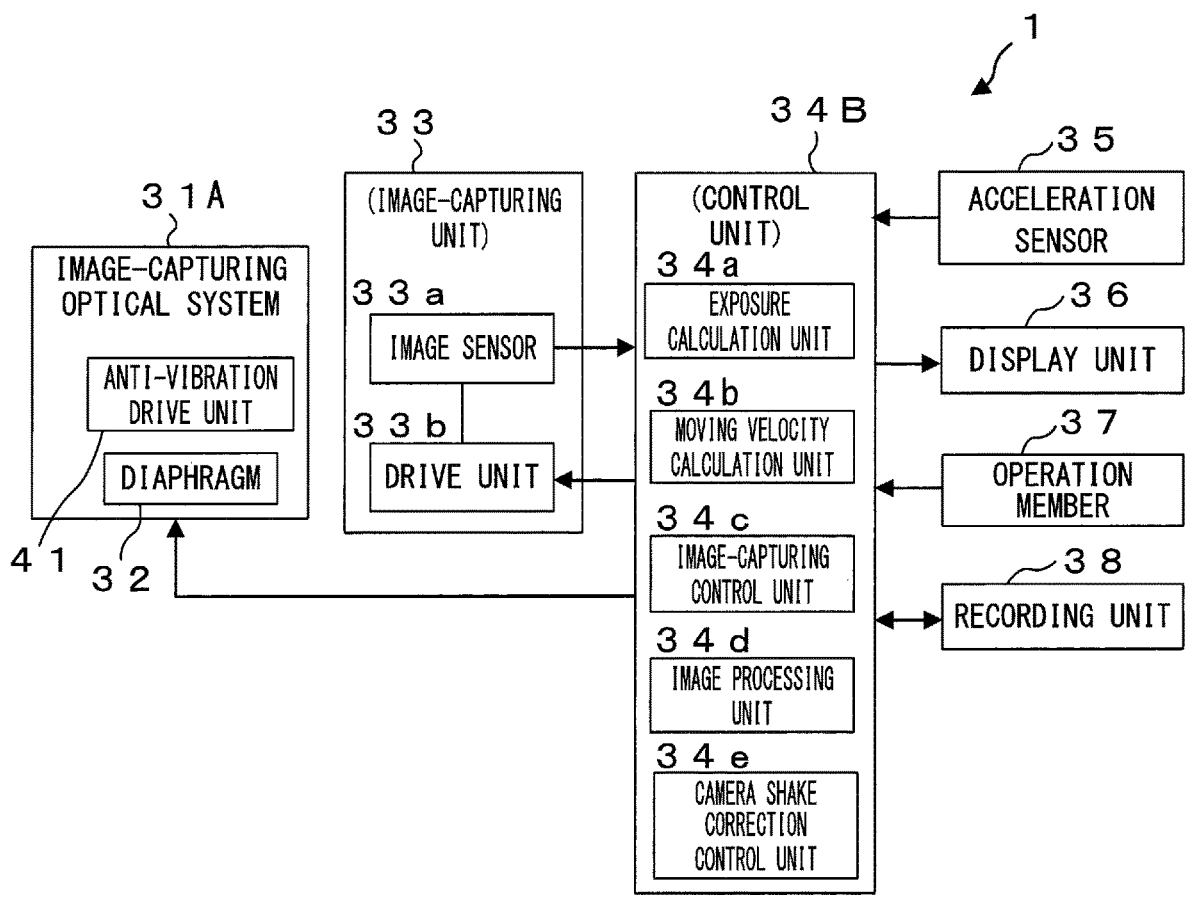
FIG. 17 is a block diagram showing a configuration of a camera according to a first modification.

FIG. 17 is a block diagram showing a configuration of a camera 1 according to a first modification. The camera 1 according to the first modification further includes the following configuration, in addition to the configuration of the camera 1 according to the first embodiment. The image-capturing optical system 31A further includes a camera shake correction lens (not shown) for performing camera shake correction and an anti-vibration drive unit 41 for driving the camera shake correction lens. The control unit 34B further includes a camera shake correction control unit 34e that controls the anti-vibration drive unit 41. The camera shake correction control unit 34e outputs a control signal to the anti-vibration drive unit 41 to reduce image blur of an image obtained by image-capturing, based on an acceleration of the camera 1 detected by an acceleration sensor 35. The anti-vibration drive unit 41 drives the camera shake correction lens (not shown) based on a control signal from the camera shake correction control unit 34e.

The intensity of vibration of the camera 1 varies depending on where the camera 1 is attached. For example, when the camera 1 is attached to the head of a person as shown in FIG. 2, the vibration of the camera 1 is smaller compared with a case where the camera 1 is attached to a ski plate.

Therefore, in the camera of the first modification, the user can set a mounting position of the camera 1 and the intensity of camera shake correction is changed according to the setting. Additionally, in the camera according to the first modification, the values of a and b, which are factors for extending the exposure time in the first embodiment, are changed based on the above-described setting. In the camera 1 according to the first modification, two positions, i.e., "human body" and "object", for example, can be set by the user operating an operation member 37 as the mounting position of the camera 1.

When the "human body" is set as the mounting position of the camera 1, the camera shake correction control unit 34b of the control unit 34B outputs a control signal to the anti-vibration drive unit 41 so as to perform camera shake correction with a first intensity. In response thereto, the anti-vibration drive unit 41 drives the camera shake correction lens (not shown) with the first intensity.

Further, in the case where the "human body" is set as the mounting position of the camera 1, when extending the exposure time, the image-capturing control unit 34c of the control unit 34B extends the exposure time while remaining the values of a and b, which are the factors for extending the exposure time, unchanged from those in the first embodiment.

When the "object" is set as the mounting position of the camera 1, the camera shake correction control unit 34b of the control unit 34B outputs a control signal to the anti-vibration drive unit 41 so as to perform camera shake correction with a second intensity, which is higher than the first intensity. In response thereto, the anti-vibration drive unit 41 drives the camera shake correction lens (not shown) with the second intensity. Therefore, the camera shake correction becomes stronger than that in the case where the mounting position of the camera 1 is set to the "human body", so that the image blur caused by the camera shake is reduced.

Further, when the "object" is set as the mounting position of the camera 1, the image-capturing control unit 34c of the control unit 34B changes the values of a and b, which are the factors for extending the exposure time, to be lower than their values in the first embodiment at the time of extending the exposure time. Therefore, the extended exposure time is shorter than that in the case where the mounting position of the camera 1 is set to the "human body", so that the image blur caused by the camera shake is reduced.

Second Modification

In the first embodiment described above, the exposure calculation unit 34a reduces the ISO sensitivity so that a proper exposure is achieved with the exposure time changed by the image-capturing control unit 34c. This prevents over-exposure due to the extended exposure time. In the second modification, in order to prevent over-exposure due to the extended exposure time, the control unit 34 may control a ND filter to be inserted in an optical path, instead of or in addition to reducing the ISO sensitivity.

Third Modification

In each of the above-described embodiments, the moving velocity calculation unit 34b of the control unit 34 calculates the moving velocity V of the camera 1 based on the acceleration of the camera 1 detected by the acceleration sensor 35. In a third modification, a distance to a subject is calculated from a defocus amount determined based on a signal from the image sensor, to determine a moving velocity of the camera 1 from a change in the calculated distance to the subject.

In the camera 1 according to the third modification, the image sensor 33a is an image sensor that can perform ranging by an image plane phase difference scheme. The control unit 34 calculates a defocus amount by a pupil division type phase difference detection scheme using a signal from the image sensor 33a and calculates a distance to a subject based on the calculated defocus amount. Then, the control unit 34 calculates a relative velocity between the subject and the camera 1 based on a change in the calculated distance to the subject, and sets the calculated relative velocity as the moving velocity V of the camera 1.

Fourth Modification

In each of the above-described embodiments, the acceleration sensor 35 is used to calculate the moving velocity V of the camera 1. In the fourth modification, a so-called TOF (time of flight) sensor is used instead of the acceleration sensor 35. The TOF sensor is an image sensor used for a known TOF method.

The TOF method involves a technique of emitting a light pulse (irradiation light) from a light source unit (not shown) toward a subject and detecting a distance to a subject based on the time until the light pulse reflected from the subject returns to a TOF sensor. The control unit 34 calculates a relative velocity between the subject and the camera 1 based on a change in the detected distance to the subject, and sets the calculated relative velocity as the moving velocity V of the camera 1.

Note that the image sensor 33a may be utilized for the TOF sensor.

Fifth Modification

In each of the above-described embodiments, the acceleration sensor 35 is used to calculate the moving velocity V of the camera 1. In the fifth modification, a GPS sensor is used instead of the acceleration sensor 35. For example, if information outputted by the GPS sensor includes information on the moving velocity, the control unit 34 treats the information on the moving velocity outputted from the GPS sensor as information on the moving velocity V of the camera 1.

For example, if information outputted by the GPS sensor does not include information on the moving velocity, the moving velocity calculation unit 34b of the control unit 34 calculates the moving velocity of the camera 1 based on a change in information on a current position outputted by the GPS sensor.

Sixth Modification

In the fourth embodiment described above, when the moving velocity V of the camera 1 increases, only a part of an image obtained by image-capturing is cut out and the cutout image is enlarged by the cropping process and the enlarging process, so that a viewer viewing a moving image feels that a range of the moving image becomes smaller as the moving velocity V of the camera 1 increases. In the sixth modification, as the moving velocity V of the camera 1 increases, the focal length of the image-capturing optical system is reduced so that the angle of view of the image obtained by image-capturing becomes smaller. That is, the image-capturing optical system 31 has a function of adjusting the focal length and the control unit 34 controls drive of a zoom lens of the image-capturing optical system 31 so that the focal length is reduced as the moving velocity V of the camera 1 increases. This achieves the same operational effects as in the case where only a part of an image obtained by image-capturing is cut out and the cutout image is enlarged by the cropping process and the enlarging process in the fourth embodiment.

In the first to fifth embodiments described above, the moving velocity of the camera 1 has been described as an example of the velocity information; however, the velocity information is not limited to the moving velocity of the camera 1. For example, the velocity information may be information on a distance between the camera 1 and a specific object. This is because the amount of change in the distance to a specific object changes as the velocity of the camera 1 increases. Specifically, the camera 1 changes the exposure time based on a magnitude (change amount, change rate) of a change in the distance between the camera 1 and the specific object.

In such an example, the control unit 34 acquires information on a distance from the camera 1 to a specific object. For example, the distance information may be acquired (calculated) from the defocus amount as described above or may be calculated from an output of the TOF sensor. The control unit 34 calculates the distance change amount K (or change rate) from the acquired distance information. If the distance change amount K (or change rate) per unit time calculated at a first timing is less than a first predetermined value K1, the image-capturing control unit 34c does not change the exposure time determined by the exposure calculation unit 34a. If the distance change amount K (or change rate) calculated in the image-capturing control unit 34c is equal to or more than the first predetermined value K1, the image-capturing control unit 34c changes the exposure time to be longer than the exposure time determined by the exposure calculation unit 34a.

More specifically, if the distance change amount K is equal to or more than the first predetermined value K1 and is less than a second predetermined value K2 (K1<K2), the image-capturing control unit 34c multiplies an exposure accumulation time determined by the exposure calculation unit 34a by factor a (which is a value larger than 1), for example. Further, if the distance change amount K is equal to or more than the second predetermined value K2, the image-capturing control unit 34c multiplies an exposure accumulation time determined by the exposure calculation unit 34a by factor b (b>a), for example.

Note that extending the exposure time in two stages in accordance with the distance change amount K (or change rate) is merely one example, and the exposure time may be extended in one stage, or in three or more stages. Further, instead of extending the exposure time in accordance with the distance change amount K (or change rate) in stages as described above, the exposure time may be continuously extended in accordance with the distance change amount K (or change rate). Specifically, the exposure time may be extended as the distance change amount K (or change rate) increases. For example, in an initial setting, the exposure time is set to an exposure time A that is between a quarter and a half of a time interval determined by a frame rate. Starting from the exposure time A, the exposure time may then be made longer as the distance change amount K (or change rate) increases.

In the first to fifth embodiments described above, the moving velocity of the camera 1 has been described as an example of the velocity information; however, the velocity information is not limited to the moving velocity of the camera 1. For example, the velocity information may be information on a size of a specific object. This is because the amount of change in the size of the specific object changes as the velocity of the camera 1 increases. Specifically, the camera 1 changes the exposure time based on a magnitude (change amount, change rate) of a change in the size of the specific object.

In such an example, the control unit 34 acquires information on a size of a photographed specific object. The size information may be acquired by using subject recognition (object recognition) technique and edge extraction technique. The control unit 34 calculates a size change amount M (or change rate) from the acquired size information on the specific subject. If the size change amount M (or change rate) per unit time calculated at a first timing is less than a first predetermined value M1, the image-capturing control unit 34c does not change the exposure time determined by the exposure calculation unit 34a. On the other hand, if the size change amount M (or change rate) calculated by the control unit 34 is equal to or more than the first predetermined value M1, the image-capturing control unit 34c changes the exposure time to be longer than the exposure time determined by the exposure calculation unit 34a.

More specifically, if the size change amount M is equal to or more than the first predetermined value M1 and is less than a second predetermined value M2 (M1<M2), the image-capturing control unit 34c multiplies an exposure accumulation time determined by the exposure calculation unit 34a by factor a (which is a value larger than 1), for example. Further, if the size change amount M is equal to or more than the second predetermined value M2, the image-capturing control unit 34c multiplies an exposure accumulation time determined by the exposure calculation unit 34a by factor b (b>a), for example.

Note that extending the exposure time in two stages in accordance with the size change amount M (or change rate) is merely one example, and the exposure time may be extended in one stage, or in three or more stages. Further, instead of extending the exposure time in accordance with the size change amount M (or change rate) in stages as described above, the exposure time may be continuously extended in accordance with the size change amount M (or change rate). Specifically, the exposure time may be extended as the size change amount M (or change rate) increases. For example, in an initial setting, the exposure time is set to an exposure time A that is between a quarter and a half of a time interval determined by a frame rate. Starting from the exposure time A, the exposure time may then be longer as the size change amount M (or change rate) increases.

In the first to fifth embodiments described above, the moving velocity of the camera 1 has been described as an example of the velocity information; however, the velocity information is not limited to the moving velocity of the camera 1. For example, the velocity information may be sound volume. This is because sound volume (in particular, wind noise volume) to be acquired becomes larger as the velocity of the camera 1 increases. Specifically, the camera 1 changes the exposure time based on sound volume acquired during photographing.

In such an example, the control unit 34 acquires information on sound volume during photographing. The sound volume information may be acquired by analyzing the captured sound to be recorded. Further, the control unit 34 may acquire information on sound volume in a specific frequency band corresponding to wind noise. The control unit 34 calculates a sound volume S from the acquired sound volume information. If the sound volume S is less than a first predetermined value S1, the image-capturing control unit 34c does not change the exposure time determined by the exposure calculation unit 34a. On the other hand, if the sound volume S is equal to or more than the first predetermined value S1, the image-capturing control unit 34c changes the exposure time to be longer than the exposure time determined by the exposure calculation unit 34a.

More specifically, if the sound volume S is equal to or more than the first predetermined value S1 and is less than a second predetermined value S2 (S1<S2), the image-capturing control unit 34c multiplies an exposure accumulation time determined by the exposure calculation unit 34a by factor a (which is a value larger than 1), for example. Further, if the sound volume S is equal to or more than the second predetermined value S2, the image-capturing control unit 34c multiplies an exposure accumulation time determined by the exposure calculation unit 34a by factor b (b>a), for example.

Note that extending the exposure time in two stages in accordance with the sound volume S is merely one example, and the exposure time may be extended in one stage, or in three or more stages. Further, instead of extending the exposure time in stages in accordance with the sound volume S as described above, the exposure time may be continuously extended in accordance with the sound volume S of the camera 1. Specifically, the exposure time may be extended as the sound volume S increases. For example, in an initial setting, the exposure time is set to an exposure time A that is between a quarter and a half of a time interval determined by a frame rate. Starting from the exposure time A, the exposure time may then be longer as the sound volume S increases.

In the first to fifth embodiments described above, examples of extending the exposure time based on the moving velocity V, the distance change amount K (change rate), the size change amount M (change rate), and the sound volume S have been described. Of course, the exposure time may be relatively shortened when the moving velocity V becomes relatively low (when the distance change amount K becomes low, when the size change amount becomes low, when the sound volume becomes low).

Additionally, in the case where the exposure time is shortened as described above, the frame rate may be increased when the exposure time becomes shorter with respect to the time interval determined by the frame rate. For example, in a case where the calculated exposure time becomes less than 1/60 of a second when moving images are photographed at an interval of 1/30 of a second, an interval of photographing of moving images may be changed to be 1/60 of a second.

In the fourth embodiment described above, the moving velocity of the camera 1 has been described as an example of the velocity information; however, the velocity information is not limited to the moving velocity of the camera 1. For example, the velocity information may be information on a distance between the camera 1 and a specific object. This is because the amount of change in the distance to a specific object changes as the velocity of the camera 1 increases. Specifically, the camera 1 changes the cropped region based on a magnitude (change amount, change rate) of a change in the distance between the camera 1 and the specific object.

In such an example, the control unit 34A acquires information on a distance from the camera 1 to a specific object during photographing. For example, the distance information may be acquired (calculated) from the defocus amount as described above or may be calculated from an output of the TOF sensor. These pieces of information may be acquired and recorded during photographing. The control unit 34A calculates the distance change amount K (or change rate) from the acquired distance information. If the distance change amount K (or change rate) per unit time calculated at a first timing is less than a first predetermined value K1, the image-capturing control unit 34d does not change the cropped region. On the other hand, if the distance change amount K (or change rate) calculated by the control unit 34A is equal to or more than the first predetermined value K1, the image processing unit 34d makes the cropped region smaller.

More specifically, for a frame having a distance change amount K that is equal to or more than the first predetermined value K1 and is less than a second predetermined value K2 (K1<K2), the image processing unit 34d sets a first cropped region for the image of the frame. Additionally, for a frame having a distance change amount K that is equal to or more than the second predetermined value K2, the image processing unit 34d sets a second cropped region that is smaller than the first cropped region for the image of the frame.

Note that changing the cropped region in two stages in accordance with the distance change amount K (or change rate) is merely one example, and the cropped region may be changed in one stage, or in three or more stages. Further, instead of extending the cropped region in accordance with the magnitude of the change in the distance in stages as described above, the cropped region may be continuously changed in accordance with the distance change amount K (or change rate). Specifically, the cropped region may be made smaller as the distance change amount K (or change rate) increases. For example, in an initial setting, the cropped region is not set (for example, full angle of view display). The cropped region may then be made smaller as the distance change amount K (or change rate) increases.

In the fourth embodiment described above, the moving velocity of the camera 1 has been described as an example of the velocity information; however, the velocity information is not limited to the moving velocity of the camera 1. For example, the velocity information may be information on a size of a specific object. This is because the amount of change in the size of the specific object changes as the velocity of the camera 1 increases. Specifically, the camera 1 makes the cropped region smaller based on a magnitude (change amount, change rate) of a change in the size of the specific object.

In such an example, the control unit 34A acquires information on a size of a photographed specific object. The size information may be acquired by using subject recognition (object recognition) technique and edge extraction technique. The image processing unit 34d calculates a size change amount M (or change rate) from the acquired size information on the specific subject. If the size change amount M (or change rate) per unit time calculated at a first timing is less than a first predetermined value M1, the image processing unit 34d does not change the cropped region. On the other hand, if the size change amount M (or change rate) calculated by a display circuit 101 is equal to or more than the first predetermined value M1, the image processing unit 34d makes the cropped region smaller.

More specifically, for a frame having a size change amount M that is equal to or more than the first predetermined value M1 and is less than a second predetermined value M2 (M1<M2), the image processing unit 34d sets a first cropped region for the image of the frame. Additionally, for a frame having a size change amount M that is equal to or more than the second predetermined value M2, the image processing unit 34d sets a second cropped region that is smaller than the first cropped region for the image of the frame. Note that changing the cropped region in accordance with the size change amount M (or change rate) is merely one example, and the cropped region may be changed in one stage, or in three or more stages. Further, instead of extending the cropped region in accordance with the size change amount M in stages as described above, the cropped region may be continuously changed in accordance with the size change amount M (or change rate). Specifically, the exposure time may be extended as the size change amount M (or change rate) increases. For example, in an initial setting, the cropped region is not set (for example, full angle of view display). The cropped region may then be made smaller as the size change amount M (or change rate) increases.

In the fourth embodiment described above, the moving velocity of the camera 1 has been described as an example of the velocity information; however, the velocity information is not limited to the moving velocity of the camera 1. For example, the velocity information may be sound volume. This is because sound volume (in particular, wind noise volume) to be acquired becomes larger as the velocity of the camera 1 increases. Specifically, the camera 1 makes the cropped region smaller based on sound volume acquired during photographing.

In such an example, the control unit 34A acquires information on sound volume during photographing. The sound volume information may be acquired by analyzing captured and recorded sound, as described above. Further, the control unit 34A may acquire information on sound volume in a specific frequency band corresponding to wind noise. The control unit 34A calculates a sound volume S from the acquired sound volume information. If the sound volume S is less than a first predetermined value S1, the image-capturing control unit 34c does not change the cropped region. On the other hand, if the sound volume S is equal to or more than the first predetermined value S1, the image processing unit 34d makes the cropped region smaller.

More specifically, for a frame having a sound volume S that is equal to or more than the first predetermined value S1 and is less than a second predetermined value S2 (S1<S2), the image processing unit 34d sets a first cropped region for the image of the frame. Additionally, for a frame having a sound volume S that is equal to or more than the second predetermined value S2, the image processing unit 34d sets a second cropped region that is smaller than the first cropped region for the image of the frame. Note that changing the cropped region in two stages in accordance with the sound volume S is merely one example, and the cropped region may be changed in one stage, or in three or more stages. Further, instead of extending the cropped region in accordance with the sound volume S in stages as described above, the cropped region may be continuously changed in accordance with the sound volume S. Specifically, the cropped region may be made smaller as the sound volume S increases. For example, in an initial setting, the cropped region is not set (for example, full angle of view display). The cropped region may then be made smaller as the sound volume S increases.

Moreover, in the fourth embodiment described above, examples of making the cropped region smaller based on the moving velocity V, the distance change amount K (change rate), the size change amount M (change rate), or the sound volume S have been described. Of course, the cropped region may be made relatively larger when the moving velocity V becomes relatively low (when the distance change amount K becomes low, when the size change amount becomes low, when the sound volume becomes low).

Now, another example of setting a region to be subjected to the process for reducing the sharpness described in the fifth embodiment will be described. In the fifth embodiment described above, the moving velocity of the camera 1 has been described as an example of the velocity information and the process for reducing sharpness of a peripheral part of an image has been described; however, the velocity information is not limited to the moving velocity of the camera 1. For example, the velocity information may be information on a distance between the camera 1 and a specific object. Specifically, the camera 1 changes the process target region based on a magnitude (change amount, change rate) of a change in the distance between the camera 1 and the specific object.

The control unit 34A calculates the distance change amount K (or change rate) from the acquired distance information. If the distance change amount K (or change rate) per unit time calculated at a first timing is less than a first predetermined value K1, the image processing unit 34d does not change the process target region. On the other hand, if the distance change amount K (or change rate) calculated by the control unit 34A is equal to or more than the first predetermined value K1, the image processing unit 34d makes the process target region larger.

More specifically, for a frame having a distance change amount K that is equal to or more than the first predetermined value K1 and is less than a second predetermined value K2 (K1<K2), the image processing unit 34d sets a first process target region for the image of the frame. Additionally, for a frame having a distance change amount K that is equal to or more than the second predetermined value K2, the image processing unit 34d sets a second process target region that is larger than the first process target region for the image of the frame.

Note that changing the cropped region in two stages in accordance with the distance change amount K (or change rate) is merely one example, and the cropped region may be changed in one stage, or in three or more stages. Further, instead of extending the process target region in accordance with the magnitude of the change in the distance in stages as described above, the process target region may be continuously changed in accordance with the distance change amount K (or change rate). Specifically, the process target region may be made larger as the distance change amount K (or change rate) increases. For example, in an initial setting, the process target region is not set (for example, full angle of view display). The process target region may then be made larger as the distance change amount K (or change rate) increases.

In the fifth embodiment described above, the moving velocity of the camera 1 has been described as an example of the velocity information; however, the velocity information is not limited to the moving velocity of the camera 1. For example, the velocity information may be information on a size of a specific object. Specifically, the camera 1 makes the process target region larger based on a magnitude (change amount, change rate) of a change in the size of the specific object.

In such an example, the control unit 34A acquires information on a size of a photographed specific object. If the size change amount M (or change rate) per unit time calculated at a first timing is less than a first predetermined value M1, the image processing unit 34d does not change the process target region. On the other hand, if the size change amount M (or change rate) calculated by the control unit 34 is equal to or more than the first predetermined value M1, the image processing unit 34d makes the process target region larger.

More specifically, for a frame having a size change amount M that is equal to or more than the first predetermined value M1 and is less than a second predetermined value M2 (M1<M2), the image processing unit 34d sets a first process target region for the image of the frame. Additionally, for a frame having a size change amount M that is equal to or more than the second predetermined value M2, the image processing unit 34d sets a second process target region that is larger than the first process target region for the image of the frame. Note that changing the process target region in accordance with the size change amount M (or change rate) is merely one example, and the process target region may be changed in one stage, or in three or more stages. Further, instead of extending the process target region in accordance with the size change amount M in stages as described above, the process target region may be continuously changed in accordance with the size change amount M (or change rate). Specifically, the process target region may be made larger as the size change amount M (or change rate) increases. For example, in an initial setting, the process target region is not set (for example, full angle of view display). The process target region may then be made larger as the size change amount M (or change rate) increases.

In the fifth embodiment described above, the moving velocity of the camera 1 has been described as an example of the velocity information; however, the velocity information is not limited to the moving velocity of the camera 1. For example, the velocity information may be sound volume. Specifically, the camera 1 makes the process target region larger based on sound volume acquired during photographing.

In such an example, the control unit 34A acquires information on sound volume during photographing. The sound volume information may be acquired by analyzing captured and recorded sound. Further, the control unit 34A may acquire information on sound volume in a specific frequency band corresponding to wind noise. The control unit 34A calculates a sound volume S from the acquired sound volume information. If the sound volume S is less than a first predetermined value S1, the image processing unit 34d does not change the process target region. On the other hand, if the sound volume S is equal to or more than the first predetermined value S1, the image processing unit 34d makes the process target region larger.

More specifically, for a frame having a sound volume S that is equal to or more than the first predetermined value S1 and is less than a second predetermined value S2 (S1<S2), the image processing unit 34d sets a first process target region for the image of the frame. Additionally, for a frame having a sound volume S that is equal to or more than the second predetermined value S2, the image processing unit 34d sets a second process target region that is larger than the first process target region for the image of the frame. Note that changing the process target region in two stages in accordance with the sound volume S is merely one example, and the process target region may be changed in one stage, or in three or more stages. Further, instead of making the process target region larger in accordance with the sound volume S in stages as described above, the process target region may be continuously changed in accordance with the sound volume S. Specifically, the process target region may be made larger as the sound volume S increases. For example, in an initial setting, the process target region is not set (for example, full angle of view display). The process target region may then be made smaller as the sound volume S increases.

In the fifth embodiment described above, examples of making the process target region larger based on the moving velocity V, the distance change amount K (change rate), the size change amount M (change rate), and the sound volume S have been described. Of course, the process target region may be made relatively smaller when the moving velocity V becomes relatively low (when the distance change amount K becomes low, when the size change amount becomes low, when the sound volume becomes low).

In the camera 1 according to each of the embodiments described above, the image-capturing unit 33 may capture images under the same condition over the entire regions of an image-capturing surface of the image sensor 33a, or may capture images under different conditions for each region of the image-capturing surface of the image sensor 33a. In this case, for example, different imaging conditions may be set for a region of the image-capturing surface corresponding to the process target region 83 in the fifth embodiment and a region of the image-capturing surface corresponding to the non-target region 84. In the following description, a region of the image-capturing surface corresponding to the process target region 83 is referred to as a first region, and a region of the image-capturing surface corresponding to the non-target region 84 is referred to as a second region.

For example, the control unit 34 may set a sensitivity of the first region lower than a sensitivity of the second region. This achieves the same operational effects as in the case where the above-described sharpness reduction process is performed, because the brightness of an image of the process target region 83 is lower than that of an image of the non-target region 84.

For example, the control unit 34 may set an exposure time of the first region longer than an exposure time of the second region and set the sensitivity of the first region lower than that of the second region so that a proper exposure is achieved even if the exposure time varies depending on the regions. This achieves the same operational effects as in the case where the image blur is added to the image of the process target region 83, because the amount of the image blur of the process target region 83 becomes larger than the amount of the image of the non-target region 84.

For example, the control unit 34 reduces a frame rate of the first region to be lower than a frame rate of the second region. This allows the exposure time of the first region to be set longer than the exposure time of the second region, so that the operational effect in the case of adding the image blur as described above can be further enhanced.

The above-described embodiments and modifications also include the following image-capturing apparatus.

(1) An image-capturing apparatus for generating a moving image, comprising: an image sensor that receives light from a subject and outputs moving image data; an acquisition unit that acquires velocity information; and a control unit that controls an exposure time of the image sensor, wherein: the control unit controls the image sensor to receive the light from the subject for a first exposure time and changing the first exposure time to a second exposure time to accumulate electric charges, the second exposure time being longer than the first exposure time, based on the velocity information on the image-capturing apparatus.

(2) The image-capturing apparatus as in (1), wherein: the acquisition unit acquires information on a moving velocity of the image-capturing apparatus; and the control unit extends the exposure time of the image sensor as the moving velocity of the image-capturing apparatus increases.

(3) The image-capturing apparatus as in (2), wherein: the control unit controls the exposure time of the image sensor to the second exposure time, the second exposure time being longer than the first exposure time, when the moving velocity of the image-capturing apparatus becomes a second moving velocity that is faster than the first moving velocity.

(4) The image-capturing apparatus as in (1), wherein: the acquisition unit acquires information on a distance to a specific object; and the control unit extends the exposure time of the image sensor as a magnitude of a change in the distance to the specific object increases.

(5) The image-capturing apparatus as in (4), wherein: the control unit controls the exposure time of the image sensor to the second exposure time that is longer than the first exposure time, when the magnitude of the change in the distance to the specific object becomes a second magnitude that is larger than the first magnitude.

(6) The image-capturing apparatus as in (1), wherein: the acquisition unit acquires information on a size of a specific object; and the control unit extends the exposure time of the image sensor as a change in the size of the specific object increases.

(7) The image-capturing apparatus as in (6), wherein: the control unit controls the exposure time of the image sensor to the second exposure time that is longer than the first exposure time when the magnitude of the change in the size to the specific object becomes a second magnitude that is larger than the first magnitude.

(8) The image-capturing apparatus as in (1), wherein: the acquisition unit acquires sound information; and the control unit extends the exposure time of the image sensor as the sound volume increases.

(9) The image-capturing apparatus as in (8), wherein: the control unit controls the exposure time of the image sensor to the second exposure time, the second exposure time being longer than the first exposure time, when a sound volume based on the sound information becomes a second sound volume that is higher than the first sound volume.

(10) The image-capturing apparatus as in (9), wherein: the control unit controls the exposure time to be the second exposure time that is longer than the first exposure time, when a volume of a component having a specific frequency of the sound becomes a second sound volume that is larger than the first sound volume.

(11) The image-capturing apparatus as in any one of (1) to (10), wherein: the image sensor outputs moving image data in a first time interval; and the control unit changes the first time interval based on the first time interval and the second exposure time.

(12) The image-capturing apparatus as in (11), wherein: the control unit changes the first time interval when the second exposure time is equal to or more than a time determined by the first time interval.

(13) The image-capturing apparatus as in any one of (1) to (11), wherein: the image sensor outputs moving image data in a first time interval; and the control unit synthesizes a first image data item among the moving image data items outputted in the first time interval and a second image data item outputted after the first image data item, based on the first time interval and the second exposure time.

(14) The image-capturing apparatus as in (13), wherein: the control unit synthesizes the first image data and the second image data when the second exposure time is equal to or more than a time determined by the first time interval.

(15) An image-capturing apparatus for generating a moving image, comprising: an image sensor that receives light from a subject and outputs moving image data; an acquisition unit that acquires velocity information on the image-capturing apparatus; and a control unit that controls a region to be processed for a moving image from the moving image data, based on the velocity information acquired by the acquisition unit.

(16) The image-capturing apparatus as in (15), wherein: the control unit causes a recording medium to record data of a partial range of the moving image data outputted from the image sensor based on the velocity information.

(17) The image-capturing apparatus as in (16), wherein: the control unit causes a recording medium to record moving image data obtained by performing image processing on the partial range of the moving image data outputted from the image sensor, based on the velocity information.

The above-described embodiments and modification also include the following program.

(18) A program executed by an image-capturing apparatus that generates a moving image based on an output from an image sensor that captures images of a subject, the program causing a computer to execute: a first step of acquiring velocity information; a second step of controlling the image sensor to receive the light from the subject for a first exposure time and accumulate by changing the first exposure time to a second exposure time, the second exposure time being longer than the first exposure time, based on the velocity information of the image-capturing apparatus acquired in the first step.

(19) A program executed by an image-capturing apparatus that generates a moving image based on an output from an image sensor that captures images of a subject, the program causing a computer to execute: an image sensor that outputs moving image data; a first step of acquiring velocity information on the image-capturing apparatus; and a second step of controlling a region to be processed for a moving image from the moving image data, based on the velocity information acquired by the first step.

Although various embodiments and modifications have been described in the above description, the present invention is not limited thereto. Other aspects contemplated within the technical idea of the present invention are also included within the scope of the present invention.

The disclosure of the following priority application is herein incorporated by reference:

Japanese Patent Application No. 2016-194630 (filed Sep. 30, 2016).

REFERENCE SIGNS LIST

1; camera
31, 31A; image-capturing optical system
32; diaphragm
33a; image sensor
34, 34A; control unit
34a; exposure calculation unit
34b; moving velocity calculation unit
34c; image-capturing control unit
34d; image processing unit

The invention claimed is:

1. An image-capturing apparatus for generating a moving image, comprising:
    an image sensor that receives light from a subject and outputs moving image data; and
    a controller that acquires velocity information; and
    controls an exposure time of the image sensor, wherein:
    the controller controls the image sensor to receive the light from the subject for a first exposure time and changing the first exposure time to a second exposure time for accumulating electric charges, the second exposure time being longer than the first exposure time, in a case where a moving velocity of the image-capturing apparatus becomes a second moving velocity that is faster than a first moving velocity.

2. The image-capturing apparatus according to claim 1, wherein:
    the controller extends the exposure time of the image sensor as the moving velocity of the image-capturing apparatus increases.

3. The image-capturing apparatus according to claim 1, wherein:
    the image sensor outputs moving image data in a first time interval; and
    the controller changes the first time interval based on the first time interval and the second exposure time.

4. The image-capturing apparatus according to claim 3, wherein:
    the controller changes the first time interval if the second exposure time is equal to or more than a time determined by the first time interval.

5. The image-capturing apparatus according to claim 1, wherein:
    the image sensor outputs moving image data in a first time interval; and
    the controller synthesizes a first image data item among the moving image data items outputted in the first time interval and a second image data item outputted after the first image data item, based on the first time interval and the second exposure time.

6. The image-capturing apparatus according to claim 5, wherein:
    the controller synthesizes the first image data and the second image data if the second exposure time is equal to or more than a time determined by the first time interval.

7. An image-capturing apparatus for generating a moving image, comprising:
    an image sensor that receives light from a subject and outputs moving image data; and
    a controller that acquires at least one of information on a distance to a specific object and information on a size of a specific object; and
    controls an exposure time of the image sensor, wherein:
    the controller (i) controls the image sensor to receive the light from the subject for a first exposure time and (ii) controls the exposure time of the image sensor to a second exposure time that is longer than the first exposure time if a magnitude of a change in the distance to the specific object or a magnitude of a change in the size of the specific object acquired by photographing becomes a second magnitude that is larger than a first magnitude.

* * * * *